United States Patent
Yang

(10) Patent No.: US 10,096,083 B2
(45) Date of Patent: Oct. 9, 2018

(54) MEDIA CONTENT RENDERING METHOD, USER EQUIPMENT, AND SYSTEM

(71) Applicant: Huawei Technologies Co., Ltd., Shenzhen (CN)

(72) Inventor: Qibin Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/791,863

(22) Filed: Oct. 24, 2017

(65) Prior Publication Data

US 2018/0047130 A1 Feb. 15, 2018

Related U.S. Application Data

(63) Continuation of application No. PCT/CN2016/075630, filed on Mar. 4, 2016.

(30) Foreign Application Priority Data

Jun. 30, 2015 (CN) .......................... 2015 1 0374452

(51) Int. Cl.
*G06T 1/20* (2006.01)
*G06T 15/20* (2011.01)
(Continued)

(52) U.S. Cl.
CPC .............. *G06T 1/20* (2013.01); *G06F 9/5072* (2013.01); *G06T 15/20* (2013.01);
(Continued)

(58) Field of Classification Search
None
See application file for complete search history.

(56) References Cited

U.S. PATENT DOCUMENTS

2009/0278842 A1* 11/2009 Peterfreund ............ A63F 13/12
345/419
2010/0229108 A1 9/2010 Gerson et al.
(Continued)

FOREIGN PATENT DOCUMENTS

CN 102185923 A 9/2011
CN 102270354 A 12/2011
(Continued)

OTHER PUBLICATIONS

"Scalable Support for 3D Graphics Applications in Cloud", by Weidong Shi, Yang Lu, Zhu Li, and J. Engelsma, 2010 IEEE 3rd International Conference on Cloud Computing, pp. 346-353. (Year: 2010).*

(Continued)

*Primary Examiner* — James A Thompson
(74) *Attorney, Agent, or Firm* — Conley Rose, P.C.

(57) ABSTRACT

The present disclosure discloses a media content rendering method. The method is applied in a user equipment (UE) in a rendering system. The method includes determining, according to a rendering requirement of to-be-rendered media content, that a part of the to-be-rendered media content is to be rendered by a cloud device; sending, to the cloud device, a rendering indication message and first media content that needs to be rendered by the cloud device, where the rendering indication message is used to instruct the cloud device to render the first media content; and receiving a cloud processing result returned by the cloud device for the first media content. The UE can perform collaboratively rendering with the cloud device for the to-be-rendered media content, so that rendering resources of the UE and the cloud device are effectively used, and media content rendering efficiency is improved.

20 Claims, 13 Drawing Sheets

(51) Int. Cl.
*G06F 9/50* (2006.01)
*H04L 29/08* (2006.01)

(52) U.S. Cl.
CPC .... *G06F 2209/505* (2013.01); *G06T 2200/28* (2013.01); *H04L 67/10* (2013.01)

(56) References Cited

U.S. PATENT DOCUMENTS

| | | | |
|---|---|---|---|
| 2010/0306813 A1* | 12/2010 | Perry | A63F 13/10 |
| | | | 725/114 |
| 2011/0263332 A1* | 10/2011 | Mizrachi | A63F 13/12 |
| | | | 463/42 |
| 2011/0304634 A1 | 12/2011 | Urbach | |
| 2013/0307847 A1 | 11/2013 | Dey et al. | |
| 2014/0179421 A1 | 6/2014 | Quinn et al. | |
| 2014/0201617 A1 | 7/2014 | Liang | |
| 2014/0241415 A1* | 8/2014 | Su | H04N 19/142 |
| | | | 375/240.02 |
| 2014/0375659 A1 | 12/2014 | McGuire et al. | |
| 2015/0281355 A1* | 10/2015 | Maturana | H04L 67/1097 |
| | | | 709/202 |

FOREIGN PATENT DOCUMENTS

| | | |
|---|---|---|
| CN | 102577327 A | 7/2012 |
| CN | 102685239 A | 9/2012 |
| CN | 103023959 A | 4/2013 |
| CN | 103049924 A | 4/2013 |
| CN | 103106680 A | 5/2013 |
| CN | 103167222 A | 6/2013 |
| CN | 103200350 A | 7/2013 |
| CN | 103268620 A | 8/2013 |
| CN | 103297516 A | 9/2013 |
| CN | 103700133 A | 4/2014 |
| CN | 104063407 A | 9/2014 |
| CN | 104346141 A | 2/2015 |
| CN | 104484530 A | 4/2015 |
| CN | 105096373 A | 11/2015 |
| WO | 2012030550 A1 | 3/2012 |

OTHER PUBLICATIONS

Machine Translation and Abstract of Chinese Publication No. CN102270354, Dec. 7, 2011, 20 pages.
Machine Translation and Abstract of Chinese Publication No. CN102577327, Jul. 11, 2012, 15 pages.
Machine Translation and Abstract of Chinese Publication No. CN102685239, Sep. 19, 2012, 12 pages.
Machine Translation and Abstract of Chinese Publication No. CN103023959, Apr. 3, 2013, 9 pages.
Machine Translation and Abstract of Chinese Publication No. CN103049924, Apr. 17, 2013, 12 pages.
Machine Translation and Abstract of Chinese Publication No. CN103106680, May 15, 2013, 12 pages.
Machine Translation and Abstract of Chinese Publication No. CN103167222, Jun. 19, 2013, 12 pages.
Machine Translation and Abstract of Chinese Publication No. CN103200350, Jul. 10, 2013, 11 pages.
Machine Translation and Abstract of Chinese Publication No. CN103268620, Aug. 28, 2013, 16 pages.
Machine Translation and Abstract of Chinese Publication No. CN103297516, Sep. 11, 2013, 24 pages.
Machine Translation and Abstract of Chinese Publication No. CN103700133, Apr. 2, 2014, 16 pages.
Machine Translation and Abstract of Chinese Publication No. CN104063407, Sep. 24, 2014, 9 pages.
Machine Translation and Abstract of Chinese Publication No. CN104346141, Feb. 11, 2015, 21 pages.
Machine Translation and Abstract of Chinese Publication No. CN104484530, Apr. 1, 2015, 6 pages.
Machine Translation and Abstract of Chinese Publication No. CN105096373, Jun. 30, 2015, 57 pages.
Foreign Communication From a Counterpart Application, Chinese Application No. 201510374452.0, Chinese Office Action dated Jul. 3, 2017, 7 pages.
Foreign Communication From a Counterpart Application, PCT Application No. PCT/CN2016/075630, English Translation of International Search Report dated May 27, 2016, 2 pages.
Shea, R., et al.,"Cloud Gaming: Architecture and Performance," XP011522533, vol. 27, No. 4, Jul. 1, 2013, 6 pages.
Xiaoqiang M., et al., "When Mobile Terminals Meet the Cloud: Computation Offloading as the Bridge," XP055449326, IEEE Network, vol. 27, No. 5, Oct. 3, 2013, 6 pages.
Shu S., et al.,"Using Graphics Rendering Contexts to Enhance the Real-Time Video Coding for Mobile Cloud Gaming," XP055449341, IEEE Transactions on Circuits and Systems for Video Technology, vol. 27, Dec. 1, 2011, 10 pages.
Huang C., et al.,"GamingAnywhere: An Open Cloud Gaming System," XP058018754, Feb. 28, 2013, pp. 36-47.
Foreign Communication From a Counterpart Application, European Application No. 16816945.6, Extended European Search Report dated Feb. 19, 2018, 10 pages.

\* cited by examiner

MEDIA CONTENT RENDERING METHOD, USER EQUIPMENT, AND SYSTEM

CROSS-REFERENCE TO RELATED APPLICATIONS

This application is a continuation of International Patent Application No. PCT/CN2016/075630, filed on Mar. 4, 2016, which claims priority to Chinese Patent Application No. 201510374452.0, filed on Jun. 30, 2015. The disclosures of the aforementioned applications are hereby incorporated by reference in their entireties.

TECHNICAL FIELD

The present disclosure relates to the field of computer technologies, and in particular, to a media content rendering method, a user equipment, and a system.

BACKGROUND

Since emergence of the computer, realistic simulation of a real world is an ultimate objective pursued in the graphics field. In computer drawing, a rendering technology refers to a process of generating an image based on a model by using software. In a graphic display operation, rendering is a last important step. A final display effect of the model and animation is obtained by means of rendering. The rendering technology is widely used in practical application scenarios such as computer gaming, video gaming, simulation, movie or television special effect, and visual design. For different display manners, rendering may be broadly classified into two types, pre-rendering (pre-rendering or offline rendering) and real-time rendering (real-time rendering or online rendering). The pre-rendering means that to-be-rendered content is placed, in advance by a developer, on a server and then rendered. The pre-rendering requires very high computation strength, and is generally used to process a complex scenario, such as cool 3D film production. Real-time rendering requires real-time experience, is usually used in a scenario such as various 3D games, and completion of the process generally needs to depend on a hardware accelerometer.

In some approaches, a local rendering or cloud rendering technology is generally used.

The local rendering technology is to perform rendering based on a model by using a hardware device of a user equipment (UE), such as a central processing unit (CPU), or a graphic processing unit (GPU). After rendering is complete, a display device invokes a rendering result for displaying. Currently, a computation capability of the hardware device, such as the CPU or the GPU, on the user equipment is limited. Consequently, a rendering speed of the hardware device is lower than a display speed of the display device. In this way, display smoothness is affected when the user equipment renders some complex scenarios.

The cloud rendering technology is to move a rendering operation from the a user equipment to a cloud for running, and then transmit a final rendering result to the user equipment in an image manner for displaying. The cloud rendering technology is a pre-rendering technology, needs to be customized in advance, cannot be requested from the cloud device according to a rendering requirement, and does not consider compatibility of the user equipment with content rendered by a cloud.

In the some approaches, content that needs to be rendered is either rendered by a cloud device according to a customized specification, or directly rendered by the user equipment directly by using local hardware; the user equipment and the cloud device cannot collaborate or cooperate according to the rendering requirement, which causes low media content rendering efficiency.

SUMMARY

To resolve a problem of low media content rendering efficiency in some approaches, embodiments of the present disclosure provide a media content rendering method. For to-be-rendered media content, a user equipment can perform collaborative rendering with a cloud device, so that rendering resources of the user equipment and the cloud device are effectively used, and media content rendering efficiency is improved. The embodiments of the present disclosure further provide corresponding a user equipment and a corresponding system.

A first aspect of the present disclosure provides a media content rendering method, where the method is applied in a user equipment in a rendering system, the rendering system further includes a cloud device, and the method includes determining, according to a rendering requirement of to-be-rendered media content, that a part of the to-be-rendered media content is to be rendered by the cloud device; sending, to the cloud device, a rendering indication message and first media content that needs to be rendered by the cloud device, where the rendering indication message is used to instruct the cloud device to render the first media content, and the first media content is a part of the to-be-rendered media content; and receiving a cloud processing result returned by the cloud device for the first media content.

With reference to the first aspect, in a first possible implementation manner, the rendering indication message carries a rendering requirement parameter for the first media content, and the rendering requirement parameter is used to instruct the cloud device to render the first media content according to the rendering requirement parameter.

With reference to the first aspect or the first possible implementation manner of the first aspect, in a second possible implementation manner, the method further includes rendering second media content to obtain a rendering result of the second media content, where the second media content is remaining media content in the to-be-rendered media content except the first media content; and synthesizing the cloud processing result and the rendering result of the second media content to obtain a synthesis result of the to-be-rendered media content, where the cloud processing result is a rendering result of the first media content.

With reference to the first aspect or the first possible implementation manner of the first aspect, in a third possible implementation manner, the method further includes rendering second media content to obtain a rendering result of the second media content, where the second media content is remaining media content in the to-be-rendered media content except the first media content; and synthesizing the cloud processing result and the rendering result of the second media content to obtain a synthesis result of the to-be-rendered media content, where the cloud processing result is obtained by synthesizing multiple layers in a rendering result of the first media content by the cloud device.

With reference to any one of the first aspect, or the first to the third possible implementation manners of the first aspect, in a fourth possible implementation manner, before the sending, to the cloud device, a rendering indication message and first media content that needs to be rendered by the cloud device, the method further includes compressing the first media content to obtain compressed media content; where the sending, to the cloud device, a rendering indication message and first media content that needs to be rendered by the cloud device includes sending the rendering indication message and the compressed media content to the cloud device.

With reference to any one of the first aspect, or the first to the third possible implementation manners of the first aspect, in a fifth possible implementation manner, before the sending, to the cloud device, a rendering indication message and first media content that needs to be rendered by the cloud device, the method further includes encrypting the first media content to obtain encrypted media content; where the sending, to the cloud device, a rendering indication message and first media content that needs to be rendered by the cloud device includes sending the rendering indication message and the encrypted media content to the cloud device.

With reference to any one of the first aspect, or the first to the third possible implementation manners of the first aspect, in a sixth possible implementation manner, before the sending, to the cloud device, a rendering indication message and first media content that needs to be rendered by the cloud device, the method further includes performing double processing, that is, encryption and compression, on the first media content to obtain double-processed media content; where the sending, to the cloud device, a rendering indication message and first media content that needs to be rendered by the cloud device includes sending the rendering indication message and the double-processed media content to the cloud device.

With reference to the second or the third possible implementation manner of the first aspect, in a seventh possible implementation manner, the rendering second media content to obtain a rendering result of the second media content includes rendering, according to a quantity of cores of the user equipment, the second media content by using multiple threads corresponding to the quantity of cores, so as to obtain the rendering result of the second media content.

A second aspect of the present disclosure provides a media content rendering method, the method is applied in a user equipment in a rendering system, the rendering system further includes a cloud device, and the method includes determining, according to a rendering requirement of to-be-rendered media content, that all to-be-rendered media content is to be rendered by a cloud device; sending a rendering indication message and the to-be-rendered media content to the cloud device, where the rendering indication message carries a rendering requirement parameter for the to-be-rendered media content, and the rendering indication message is used to instruct the cloud device to render the to-be-rendered media content according to the rendering requirement parameter; and receiving a cloud processing result returned by the cloud device for the to-be-rendered media content.

With reference to the second aspect, in a first possible implementation manner, the cloud processing result is a rendering result of the to-be-rendered media content, and the method further includes synthesizing multiple layers in the rendering result of the to-be-rendered media content to obtain a synthesis result of the to-be-rendered media content.

With reference to the second aspect or the first possible implementation manner of the second aspect, in a second possible implementation manner, before the sending a rendering indication message and the to-be-rendered media content to the cloud device, the method further includes compressing the to-be-rendered media content to obtain compressed media content; where the sending a rendering indication message and the to-be-rendered media content to the cloud device includes sending the rendering indication message and the compressed media content to the cloud device.

With reference to the second aspect or the first possible implementation manner of the second aspect, in a third possible implementation manner, before the sending a rendering indication message and the to-be-rendered media content to the cloud device, the method further includes encrypting the to-be-rendered media content to obtain encrypted media content; where the sending a rendering indication message and the to-be-rendered media content to the cloud device includes sending the rendering indication message and the encrypted media content to the cloud device.

With reference to the second aspect or the first possible implementation manner of the second aspect, in a fourth possible implementation manner, before the sending a rendering indication message and the to-be-rendered media content to the cloud device, the method further includes performing double processing, that is, encryption and compression, on the to-be-rendered media content to obtain double-processed media content; where the sending a rendering indication message and the to-be-rendered media content to the cloud device includes sending the rendering indication message and the double-processed media content to the cloud device.

A third aspect of the present disclosure provides a user equipment, where the user equipment is applied in a rendering system, the rendering system further includes a cloud device, and the user equipment includes a determining module configured to determine, according to a rendering requirement of to-be-rendered media content, that a part of the to-be-rendered media content is to be rendered by the cloud device; a sending module configured to send to the cloud device, after the determining module determines that a part of the to-be-rendered media content is to be rendered by the cloud device, a rendering indication message and first media content that needs to be rendered by the cloud device, where the rendering indication message is used to instruct the cloud device to render the first media content, and the first media content is a part of the to-be-rendered media content; and a receiving module configured to after the sending module sends the rendering indication message and the first media content that needs to be rendered by the cloud device, receive a cloud processing result returned by the cloud device for the first media content.

With reference to the third aspect, in a first possible implementation manner, the rendering indication message carries a rendering requirement parameter for the first media content, and the rendering requirement parameter is used to instruct the cloud device to render the first media content according to the rendering requirement parameter.

With reference to the third aspect or the first possible implementation manner of the third aspect, in a second possible implementation manner, the user equipment further includes a first rendering module configured to render second media content to obtain a rendering result of the second media content, where the second media content is remaining media content in the to-be-rendered media content except the first media content sent by the sending module; and a first synthesis module configured to synthesize the cloud processing result received by the receiving module and the rendering result of the second media content rendered by the first rendering module, so as to obtain a synthesis result of the to-be-rendered media content, where the cloud processing result is a rendering result of the first media content.

With reference to the third aspect or the first possible implementation manner of the third aspect, in a fourth possible implementation manner, the user equipment further includes a second rendering module configured to when the sending module sends the rendering indication message and the first media content that needs to be rendered by the cloud device, render second media content to obtain a rendering result of the second media content, where the second media content is remaining media content in the to-be-rendered media content except the first media content sent by the sending module; and a second synthesis module configured to synthesize the cloud processing result received by the receiving module and the rendering result of the second media content rendered by the second rendering module, so as to obtain a synthesis result of the to-be-rendered media content, where the cloud processing result is obtained by synthesizing multiple layers in a rendering result of the first media content by the cloud device.

With reference to any one of the third aspect, or the first to the third possible implementation manners of the third aspect, in a fifth possible implementation manner, the user equipment further includes a compression module; where the compression module is configured to before the sending module sends the rendering indication message and the first media content that needs to be rendered by the cloud device, compress the first media content to obtain compressed media content; and the sending module is configured to send, to the cloud device, the rendering indication message and the media content that is compressed by the compression module.

With reference to any one of the third aspect, or the first to the third possible implementation manners of the third aspect, in a sixth possible implementation manner, the user equipment further includes an encryption module; where the encryption module is configured to before the sending module sends the rendering indication message and the first media content that needs to be rendered by the cloud device, encrypt the first media content to obtain encrypted media content; and the sending module is configured to send, to the cloud device, the rendering indication message and the media content that is encrypted by the encryption module.

With reference to any one of the third aspect, or the first to the third possible implementation manners of the third aspect, in a seventh possible implementation manner, the user equipment further includes a double-processing module; where the double-processing module is configured to before the sending module sends the rendering indication message and the first media content that needs to be rendered by the cloud device, perform double processing, that is, encryption and compression, on the first media content to obtain double-processed media content; and the sending module is configured to send, to the cloud device, the rendering indication message and the media content that is double processed by the double-processing module.

With reference to the second possible implementation manner of the third aspect, in a eighth possible implementation manner, the first rendering module is configured to render, according to a quantity of cores of the user equipment, the second media content by using multiple threads corresponding to the quantity of cores, so as to obtain the rendering result of the second media content.

A fourth aspect of the present disclosure provides a user equipment, where the user equipment is applied in a rendering system, the rendering system further includes a cloud device, and the user equipment includes a determining module configured to determine, according to a rendering requirement of to-be-rendered media content, that all to-be-rendered media content is to be rendered by a cloud device; a sending module configured to when the determining module determines that all to-be-rendered media content is to be rendered by the cloud device, send a rendering indication message and the to-be-rendered media content to the cloud device, where the rendering indication message carries a rendering requirement parameter for the to-be-rendered media content, and the rendering indication message is used to instruct the cloud device to render the to-be-rendered media content according to the rendering requirement parameter; and a receiving module configured to after the sending module sends the rendering indication message and the to-be-rendered media content, receive a cloud processing result returned by the cloud device for the to-be-rendered media content.

With reference to the fourth aspect, in a first possible implementation manner, the user equipment further includes a synthesis module configured to synthesize multiple layers in a rendering result that is of the to-be-rendered media content and that is received by the receiving module, so as to obtain a synthesis result of the to-be-rendered media content.

With reference to the fourth aspect or the first possible implementation manner of the fourth aspect, in a second possible implementation manner, the user equipment further includes a compression module; where the compression module is configured to before the sending module sends the rendering indication message and the to-be-rendered media content to the cloud device, compress the to-be-rendered media content to obtain compressed media content; and the sending module is configured to send, to the cloud device, the rendering indication message and the media content that is compressed by the compression module.

With reference to the fourth aspect or the first possible implementation manner of the fourth aspect, in a third possible implementation manner, the user equipment further includes an encryption module; where the encryption module is configured to before the sending module sends the rendering indication message and the to-be-rendered media content to the cloud device, encrypt the to-be-rendered media content to obtain encrypted media content; and the sending module is configured to send, to the cloud device, the rendering indication message and the media content that is encrypted by the encryption module.

With reference to the fourth aspect or the first possible implementation manner of the fourth aspect, in a fourth possible implementation manner, the user equipment further includes a double-processing module; where the double-processing module is configured to before the sending module sends the rendering indication message and the to-be-rendered media content to the cloud device, perform double processing, that is, encryption and compression, on the to-be-rendered media content to obtain double-processed media content; and the sending module is configured to send, to the cloud device, the rendering indication message and the media content that is double processed by the double-processing module.

A fifth aspect of the present disclosure provides a media rendering system, including a user equipment and a cloud device, where the user equipment is the user equipment according to any one of the foregoing third aspect or possible implementation manners of the third aspect.

A sixth aspect of the present disclosure provides a media rendering system, including user equipment and a cloud device, where the user equipment is the user equipment according to any one of the foregoing fourth aspect or possible implementation manners of the fourth aspect.

The media content rendering method provided in the embodiments of the present disclosure is applied in user equipment in a rendering system. The rendering system further includes a cloud device. The method includes determining, according to a rendering requirement of to-be-rendered media content, that a part of the to-be-rendered media content is to be rendered by the cloud device; sending, to the cloud device, a rendering indication message and first media content that needs to be rendered by the cloud device, where the rendering indication message is used to instruct the cloud device to render the first media content, and the first media content is a part of the to-be-rendered media content; and receiving a cloud processing result returned by the cloud device for the first media content. Unlike media content rendering efficiency in some approaches, according to the media content rendering method provided in the embodiments of the present disclosure, the user equipment can perform collaborative rendering with the cloud device for the to-be-rendered media content. The to-be-rendered media content is jointly rendered by the user equipment and the cloud device, so that rendering resources of the user equipment and the cloud device are effectively used, and the media content rendering efficiency is improved.

BRIEF DESCRIPTION OF DRAWINGS

To describe the technical solutions in the embodiments of the present disclosure more clearly, the following briefly describes accompanying drawings for describing the embodiments. Drawings in the following description show some embodiments of the present disclosure, and a person skilled in art may still derive other drawings from these accompanying drawings.

DESCRIPTION OF EMBODIMENTS

Embodiments of the present disclosure provide a media content rendering method. A user equipment can perform collaborative rendering on to-be-rendered media content with a cloud device, so that rendering resources of the user equipment and the cloud device are effectively used, and media content rendering efficiency is improved. The embodiments of the present disclosure further provide corresponding a user equipment and a corresponding system. Details are separately provided in the following.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure shall fall within the protection scope of the present disclosure.

Figure 1:
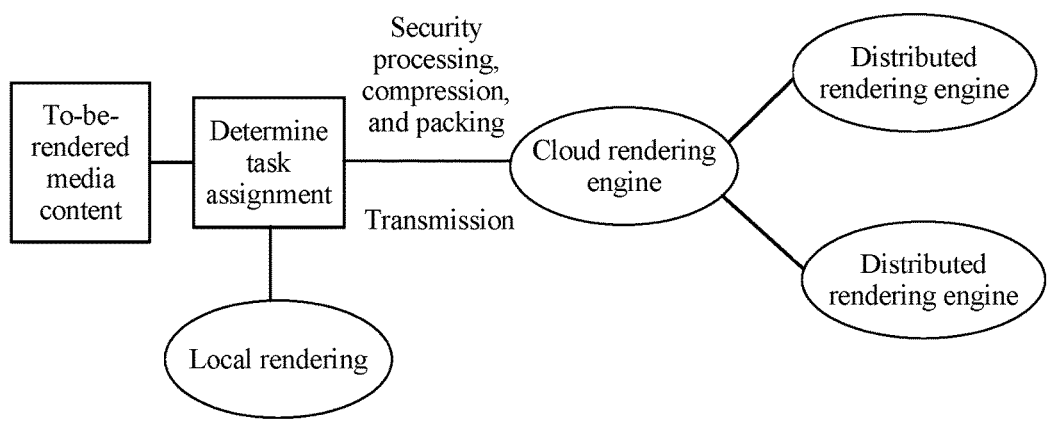
FIG. 1 is a schematic diagram of an embodiment of a media content rendering method according to an embodiment of the present disclosure.

A user equipment in the embodiments of the present disclosure may include a handheld device, an in-vehicle device, a wearable device, or a computing device that provides a radio communication function; another processing device connected to a wireless modem; or a user equipment in various forms, including mobile station (MS), a terminal, terminal equipment, and the like. For ease of description, in this application, these devices are simply referred to as a user equipment or UE. A cloud device may be a cloud server in a cloud computing system, or may be a virtual machine on a cloud server.

Referring to FIG. 1, an embodiment of a media content rendering method according to an embodiment of the present disclosure includes after to-be-rendered media content is analyzed by using a rendering manager of a user equipment, determining rendering task assignment of the to-be-rendered media content. The rendering task assignment is to determine that all to-be-rendered media content is to be rendered by a cloud, or only a part of the to-be-rendered media content is to be rendered by a cloud, or all to-be-rendered media content is to be rendered by the user equipment. If it is determined that the to-be-rendered media content is to be rendered by the cloud, the user equipment performs security processing on the to-be-rendered media content, compresses and packs the to-be-rendered media content in a format desired by a cloud rendering engine, and securely transmits the media content to the cloud rendering engine by using a client-cloud collaborative processing engine and by means of network communication. According to a cloud load status, the cloud rendering engine refines a task that needs to be rendered, performs parallelization segmentation, and distributes segmented tasks to distributed rendering engines for rendering. The cloud may have multiple distributed rendering engines, and can perform parallel rendering at a high speed according to a rendering request of the user equipment, so as to accelerate rendering and displaying of the media content. After rendering is complete, similarly, rendered data information is returned to a display buffer of the user equipment in a negotiated compression format, so as to complete rendering by a cloud device. If the user equipment determines that local rendering is performed by the user equipment, the to-be-rendered media content is separately sent to a 2D or 3D rendering module according to a display requirement. The 2D or 3D rendering module may be a CPU or a GPU. After completing rendering processing according to a specific rendering command, the rendering module sends a rendering result to a synthesis processing module for synthesizing. The synthesis processing module may be a dedicated synthesis processing module, or the GPU may be used to perform synthesis processing. After the synthesis processing is complete, a display device may directly read display information from a display buffer for displaying. Certainly, it may be that a part of the to-be-rendered media content stays in the user equipment for rendering, and the other part of the to-be-rendered media content is sent to the cloud device for rendering. A client-cloud collaborative module is needed in a manner in which a user equipment and the cloud device perform collaborative rendering. The client-cloud collaborative module may segment a rendering task, and determine a part of a segmented rendering task that requires rendering by a user equipment, and a part of the segmented rendering task that requires rendering by a cloud device. The display device may be a cathode ray tube (CRT) display, a liquid crystal display (LCD), a projector, a holographic television, or the like.

When the user equipment and the cloud device perform collaborative rendering, the to-be-rendered media content includes first media content and second media content. The first media content is to be rendered by a cloud device, and the second media content is to be rendered by a user equipment. Both the first media content and the second media content are subsets of the to-be-rendered media content.

The user equipment sends, to the cloud device, a rendering indication message and the first media content that needs to be rendered by the cloud device. The rendering indication message is used to instruct the cloud device to render the first media content. The user equipment renders the second media content to obtain a rendering result of the second media content. Before sending, to the cloud device, the rendering indication message and the first media content that needs to be rendered by the cloud device, the user equipment may further perform encryption or compression processing on the first media content, or perform double processing, that is, encryption and compression. A sequence of the encryption and the compression is not limited.

The rendering indication message carries a rendering requirement parameter for the first media content, and the rendering requirement parameter is used to instruct the cloud device to render the first media content according to the rendering requirement parameter. The rendering requirement parameter may be a resolution of a display device on the user equipment. In this case, the cloud device may obtain, by means of direct rendering, a rendering result that matches the display device of the user equipment, so that rendering is implemented according to a requirement of the user equipment.

The user equipment receives a cloud processing result returned by the cloud device for the first media content. The cloud processing result may be a rendering result of the first media content. For example, when the first media content includes multiple layers, the rendering result of the first media content may be the multiple layers that are rendered. The cloud processing result may also be a synthesis result of the first media content. The cloud device may synthesize rendered layers to obtain the synthesis result of the first media content, and return the synthesis result of the first media content to the user equipment.

When the cloud processing result is the rendering result of the first media content, the cloud processing result is synthesized with the rendering result of the second media content to obtain a synthesis result of the to-be-rendered media content. A synthesis process is a process of stitching and/or superimposing layers. When all layers belong to different regions of an image to be finally displayed, all layers are stitched. When two or more layers belong to a same region, layers belonging to the same region are superimposed, and layers belonging to different regions are stitched. The synthesis result is a finally displayed image of the to-be-rendered media content, for example, an application icon interface of a mobile phone.

When the cloud processing result is the synthesis result of the first media content, the cloud processing result is synthesized with the rendering result of the second media content to obtain a synthesis result of the to-be-rendered media content.

When the user equipment renders the second media content, if the user equipment is a multi-core device, the user equipment may render the second media content by using multiple threads corresponding to a quantity of cores, so as to obtain the rendering result of the second media content. In this way, rendering efficiency can be improved.

According to the media content rendering method provided in this embodiment of the present disclosure, user equipment may perform collaborative rendering on to-be-rendered media content with a cloud device. The to-be-rendered media content is jointly rendered by the user equipment and the cloud device, so that rendering resources of the user equipment and the cloud device are effectively used, and media content rendering efficiency is improved.

Figure 2:
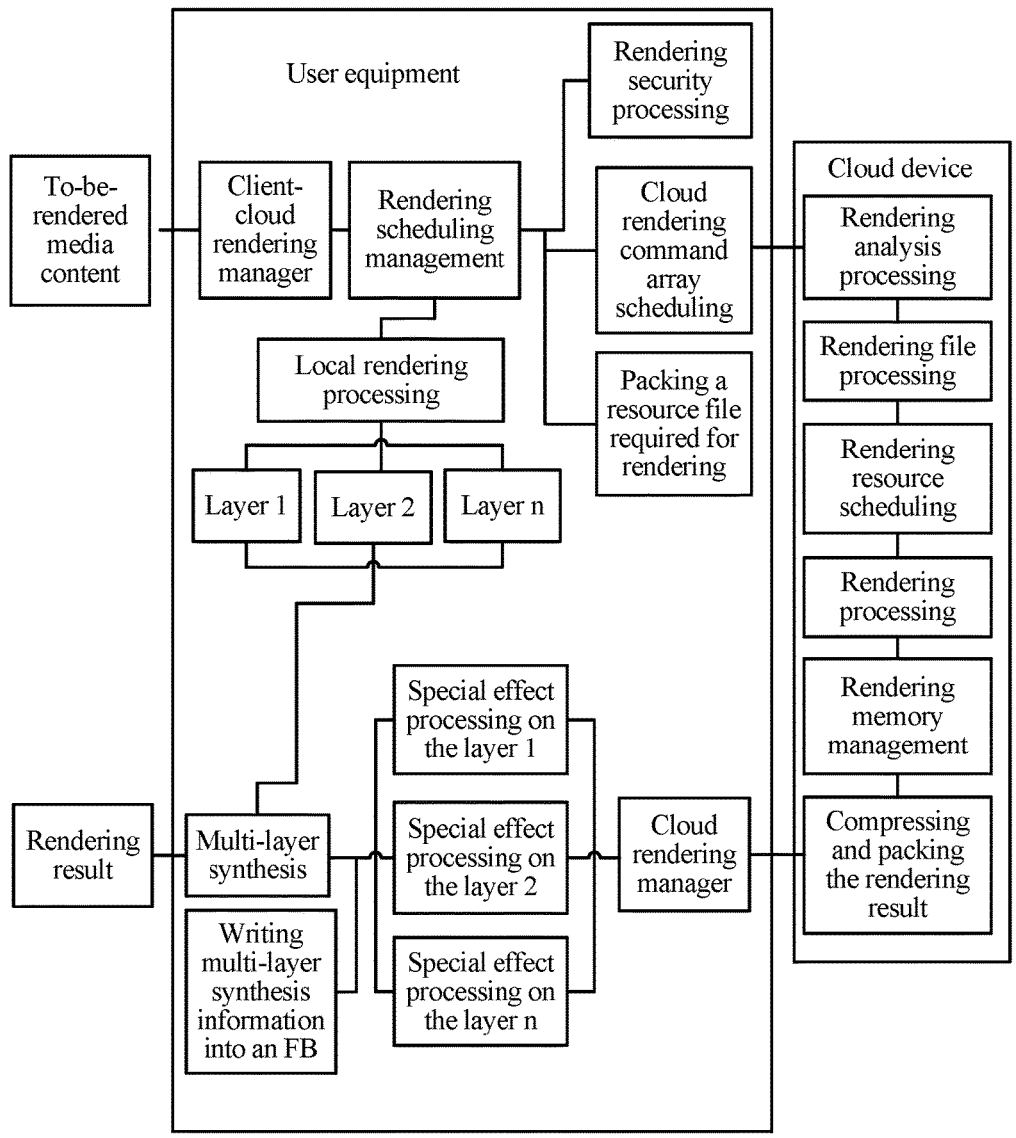
FIG. 2 is a schematic diagram of another embodiment of a media content rendering method according to an embodiment of the present disclosure.

FIG. 2 is a schematic diagram of another embodiment of a media content rendering method according to an embodiment of the present disclosure.

As shown in FIG. 2, when user equipment performs rendering processing for to-be-rendered media content, a client-cloud rendering manager in the user equipment analyzes the to-be-rendered media content. If the client-cloud rendering manager determines, by means of analysis, that the to-be-rendered media content is suitable for being rendered by a cloud device, a rendering scheduler performs scheduling management, packs the to-be-rendered media content in a specific format according to a rendering requirement of a rendering engine in the cloud device, and sends a rendering command. The cloud device performs rendering analysis processing, rendering file processing, rendering resource scheduling, rendering processing, and rendering memory management on the to-be-rendered media content to obtain a rendering result, compresses and packs the rendering result, and returns the rendering result to the user equipment. A cloud rendering manager in the user equipment performs special effect processing on the rendering result separately in this order a layer 1, a layer 2, . . . , a layer n, performs multi-layer synthesis, and writes multi-layer synthesis information into a frame buffer (FB) after the synthesis. Rendering steps such as rendering analysis processing, rendering file processing, rendering resource scheduling, rendering processing, and rendering memory management belong to some approaches, and details are not described herein. If the client-cloud rendering manager determines, by means of analysis, that the to-be-rendered media content is suitable for being rendered by a user equipment, the user equipment performs a local rendering processing procedure, and performs special effect processing separately in this order a layer 1, a layer 2, . . . , a layer n after rendering, performs multi-layer synthesis, and writes multi-layer synthesis information into the FB after the synthesis. Alternatively, a part of the to-be-rendered media content may be locally rendered, and the other part may be sent to the cloud device for rendering. Finally, all results obtained by means of rendering by the cloud device and by means of local rendering need to be synthesized. A synthesis process may be performed by a local display controller, or may be that the cloud device synthesizes a part of the to-be-rendered media content rendered by the cloud device, the user equipment performs synthesis processing on locally rendered media content and a synthesis result of the cloud device, and a final result is displayed on a display device after synthesis.

In this embodiment of the present disclosure, to-be-rendered media content may be an image, a video image, or the like. When rendering task assignment of the to-be-rendered media content is being determined, the user equipment may first determine a computation workload of rendering the to-be-rendered media content, and then compare the computation workload with a preset threshold. If the computation workload is greater than the preset threshold, it is determined that rendering is to be performed by the cloud device; or if the computation workload is less than the preset threshold, it is determined that the rendering is to be locally performed by the user equipment. When the computation workload is greater than the preset threshold, it may be determined that complex to-be-rendered content in the to-be-rendered media content is to be rendered by a cloud, and simple to-be-rendered content is to be locally rendered.

Figure 3:
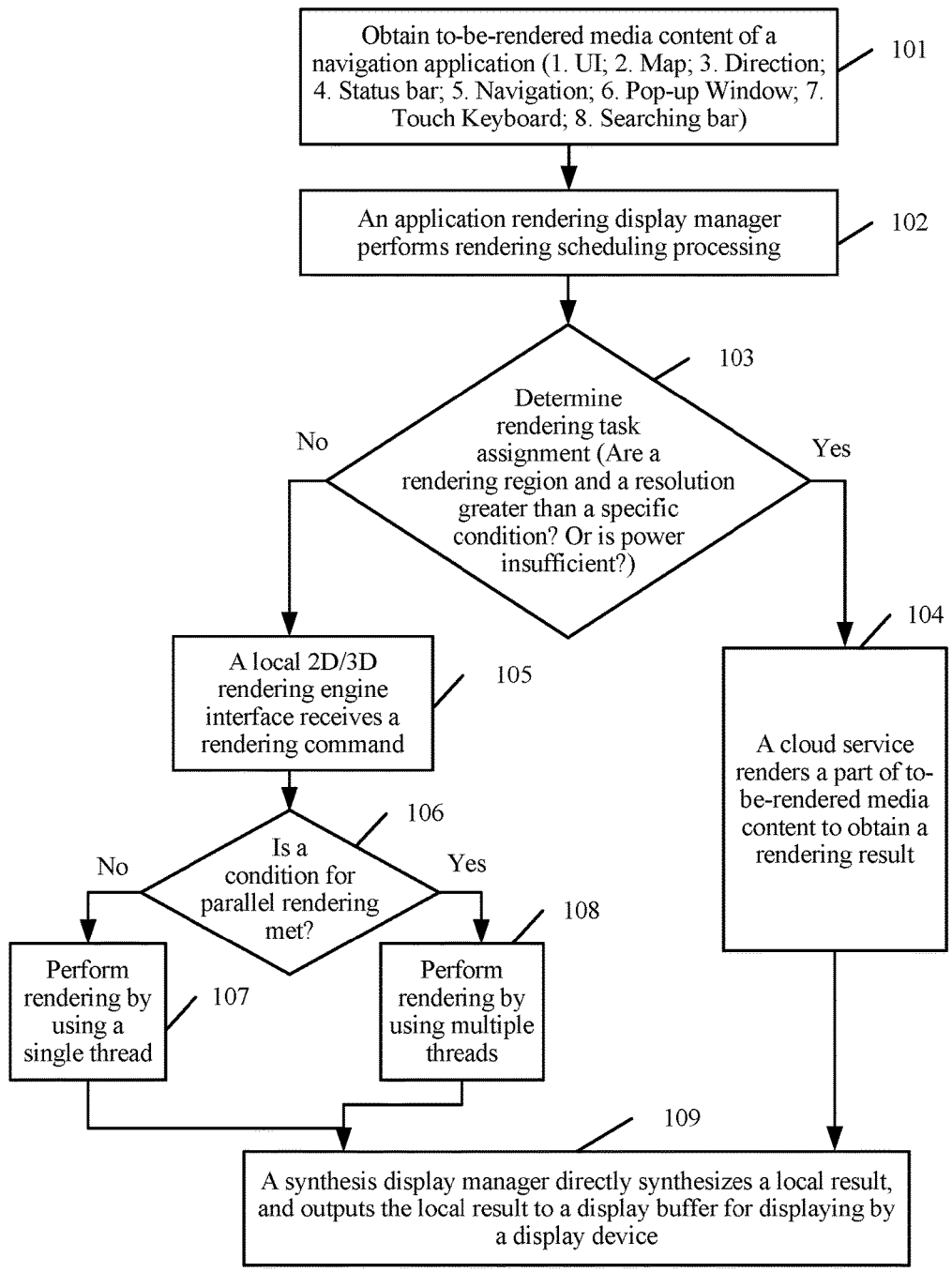
FIG. 3 is a schematic diagram of another embodiment of a media content rendering method according to an embodiment of the present disclosure.

FIG. 3 is a schematic diagram of another embodiment of a media content rendering method according to an embodiment of the present disclosure.

As shown in FIG. 3, a navigation application is used as an example to describe a media content rendering process in this embodiment of the present disclosure.

101. Obtain to-be-rendered media content of the navigation application.

The navigation application is a common complex scenario of a user equipment. To-be-rendered media content in the navigation application scenario may include a user interface (UI), a map, a direction, a status bar, navigation, Pop-up Window, a touch keyboard, and a searching bar.

When the navigation application is started, because multiple layers need to be rendered, in this case, rendering efficiency can be improved in a manner in which a user equipment and a cloud device perform collaborative rendering.

102. An application rendering display manager performs rendering scheduling processing.

103. Determine rendering task assignment, and when it is determined that some or all rendering tasks need to be performed by a cloud, perform a rending step.

For example, the rendering task assignment may be determined by determining whether a rendering region and a resolution are greater than a specific condition, or by determining remaining power of apiece of terminal device.

An application rendering manager is used to determine whether a currently involved layer needs to be rendered by the cloud device. Herein, by means of condition-based determining, it is found that layers such as the UI interface, the map, the direction, the Pop Win, and the soft keyboard have large display regions and require displaying of complex content, and it is determined that the to-be-rendered media content is to be rendered by the cloud device. In addition, if power of a user equipment is insufficient, for example, when the power is less than 10%, rendering may also be performed by the cloud device. Other simple layers such as the status bar and a navigation menu may be locally rendered by a user equipment.

104. A cloud device renders a part of to-be-rendered media content.

The to-be-rendered media content rendered by the cloud may include layers that have large display regions and require the displaying of complex content, such as the UI interface, the map, the direction, the pop-up window, and the soft keyboard.

To ensure rendering efficiency, it should be ensured that data transmitted by the user equipment to the cloud device includes possibly least data volume. Therefore, a hardware IP may be used to compress to-be-transmitted data, so as to ensure that the cloud device receives a complete rendering command in a timely manner and performs the cloud rendering. For data transmission between the user equipment and the cloud device, a user-defined communication protocol may be used for interaction, or certainly, a currently general standard protocol may be used for communication, such as a Real-time Transport Protocol (RTP), a Transmission Control Protocol (TCP), a User Datagram Protocol (UDP), an Internet Protocol (IP), or another network protocol. To ensure security of data information transmitted in a network, security encryption may be performed by using an irreversible encryption algorithm, a user-defined security encryption algorithm, or an existing common network encryption algorithm. After receiving a rendering indication message and a part of the to-be-rendered media content, a rendering engine of the cloud device performs security authentication and decryption, and then schedules, according to the rendering indication message, an appropriate distributed rendering engine to perform rendering. A simplest mode is to perform rendering by using one cloud rendering engine for one rendering layer. Certainly, alternatively, a current layer may be segmented into multiple sub-blocks according to a complexity degree of the current layer, and then parallel rendering is performed on these sub-blocks. After rendering is complete, whether to synthesize all rendered layers on the cloud is determined according to a command of the user equipment. If synthesis needs to be performed by the cloud, synthesis processing may be performed by using a cloud high-speed synthesizer. The synthesis includes but is not limited to the following operations rotation, stretching, tailoring, alpha-blending, dithering, gamma correction, YUV/RGB format conversion, and the like. After the synthesis is complete, an encrypted and compressed data packet is output and sent back to the user equipment.

105. A local 2D/3D rendering engine interface receives a rendering command.

106. Determine whether a condition for parallel rendering is met, and if the condition for parallel rendering is met, step 108 is performed; or if the condition for parallel rendering is not met, step 107 is performed.

107. Perform rendering by using a single thread.

108. Perform rendering by using multiple threads.

For a layer to be locally rendered, multiple cores of the user equipment can also be used, according to a multi-core capability of the user equipment, to perform parallel acceleration rendering. The multiple cores in this embodiment of the present disclosure include but are not limited to locally available cores, such as a CPU, a GPU, and a digital signal processor (DSP).

109. An application rendering display manager performs rendering scheduling processing.

After performing security check on a data packet received from the cloud device, a user equipment decrypts the data packet and then outputs the data packet to a cloud display buffer. After performing synthesis processing on data in the cloud display buffer and data in a local display buffer, a synthesizer of a user equipment outputs a synthesis result to a buffer of a local display device, so that the synthesis result can be displayed on a screen. By using a rendering solution in which a client is combined with a cloud, a complex scenario is rendered by the cloud device, which greatly saves power consumption for local rendering and improves the rendering efficiency, thereby reflecting an advantage of the solution.

In addition, for animation and sliding scenarios, client-cloud data transmission may be implemented by using a media coding format, so as to reduce network transmission load, and deliver higher rendering efficiency by leveraging an advantage of media coding.

Figure 4:
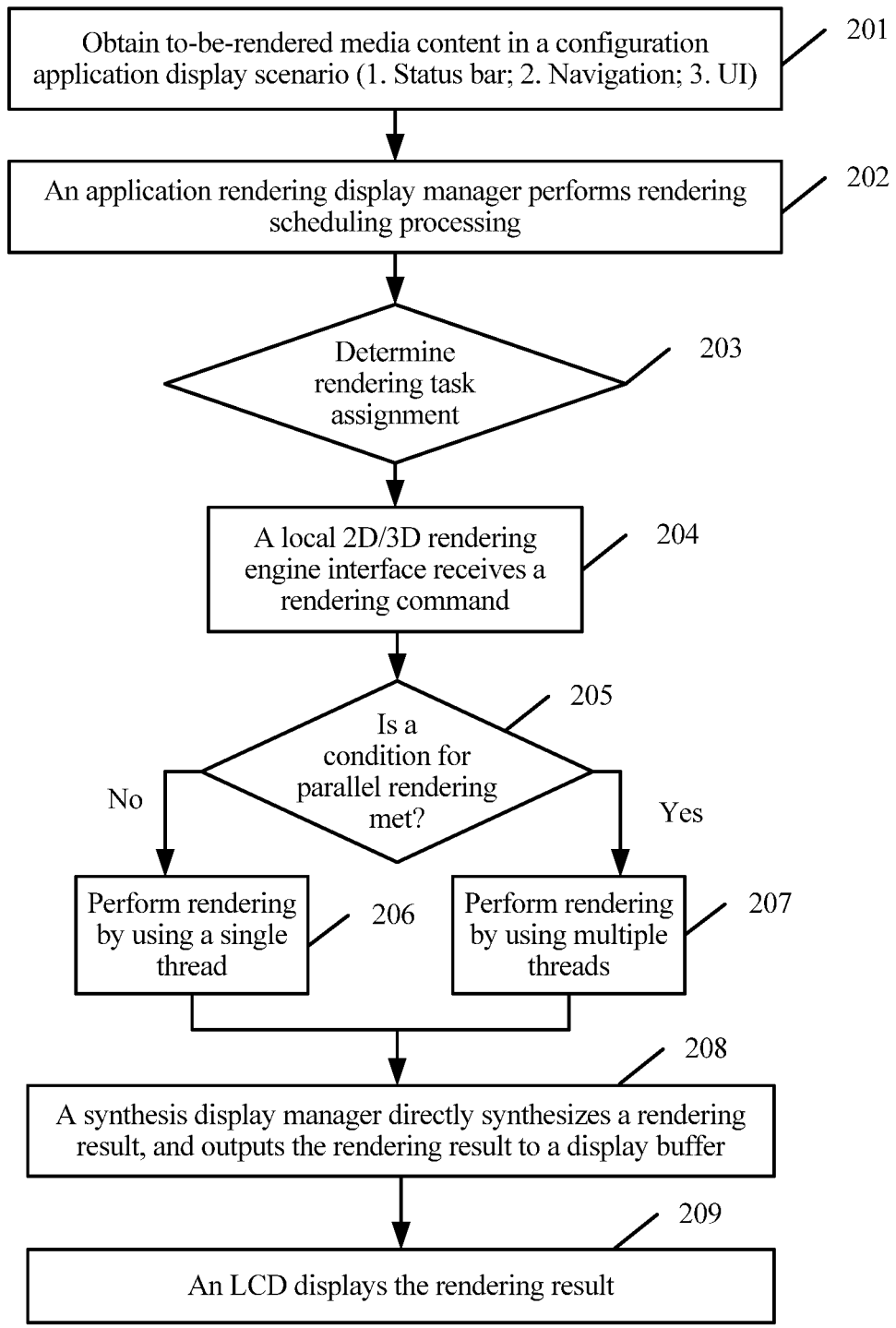
FIG. 4 is a schematic diagram of another embodiment of a media content rendering method according to an embodiment of the present disclosure.

FIG. 4 is a schematic diagram of another embodiment of a media content rendering method according to an embodiment of the present disclosure.

A scenario shown in FIG. 4 is a scenario in which rendering is only locally performed by a user equipment. A media content rendering process in the embodiment shown in FIG. 4 includes the following steps.

201. Obtain to-be-rendered media content in a specified application display scenario.

The to-be-rendered media content in a specified application display scenario that is set may include a status bar, Navigation, a UI, and the like.

202. An application rendering display manager performs rendering scheduling processing.

203. Determine rendering task assignment.

For example, the rendering task assignment may be determined by determining whether a rendering region and a resolution are greater than a specific condition, or by determining remaining power of apiece of terminal device.

In this embodiment of the present disclosure, it is determined that the rendering is to be locally performed by the user equipment.

For some local simple applications on a user equipment, because content and layers that are to be displayed are not complex, a local rendering device may be used to complete rendering. When an application that is set is started, because the UI is simple, and the status bar and a navigation bar have a narrow display region, a cloud acceleration rendering mechanism may not be used, and a rendering display process may be directly completed by using the local rendering device.

204. A local 2D/3D rendering engine interface receives a rendering command.

205. Determine whether a condition for parallel rendering is met, and if the condition for parallel rendering is met, step 207 is performed; or if the condition for parallel rendering is not met, step 206 is performed.

A local rendering command is sent to the 2D/3D rendering module, and then whether to perform parallel acceleration rendering (mainly by using multiple cores to accelerate rendering) is determined according to a display region of a target rendering layer. If a condition for a multi-core rendering mode is met, an appropriate quantity of threads may be assigned by using a multi-core affinity algorithm according to a current quantity of cores of the user equipment, so as to perform parallel acceleration rendering. Then, a rendering result is sent to a local synthesis display processor, so as to complete a 2D synthesis operation (the synthesis includes but is not limited to the following operations rotation, stretching, tailoring, alpha-blending, dithering, gamma correction, YUV/RGB conversion, and the like). The 2D synthesis operation may be completed by a CPU, a GPU, and a dedicated hardware synthesizer.

206. Perform rendering by using a single thread.

207. Perform rendering by using multiple threads.

For a layer to be locally rendered, multiple cores of the a user equipment can also be used, according to a multi-core capability of the a user equipment, to perform parallel acceleration rendering. The multiple cores include but are not limited to locally available cores, such as a CPU, a GPU, and a DSP.

208. A synthesis display manager directly synthesizes a rendering result, and outputs the rendering result to a display buffer.

209. A display device displays the rendering result.

When a rendering workload is very small, the rendering is directly locally performed by the user equipment without a need of transmitting data to a cloud device. For to-be-rendered content with a relatively small rendering workload, rendering efficiency may also be improved.

Figure 5:
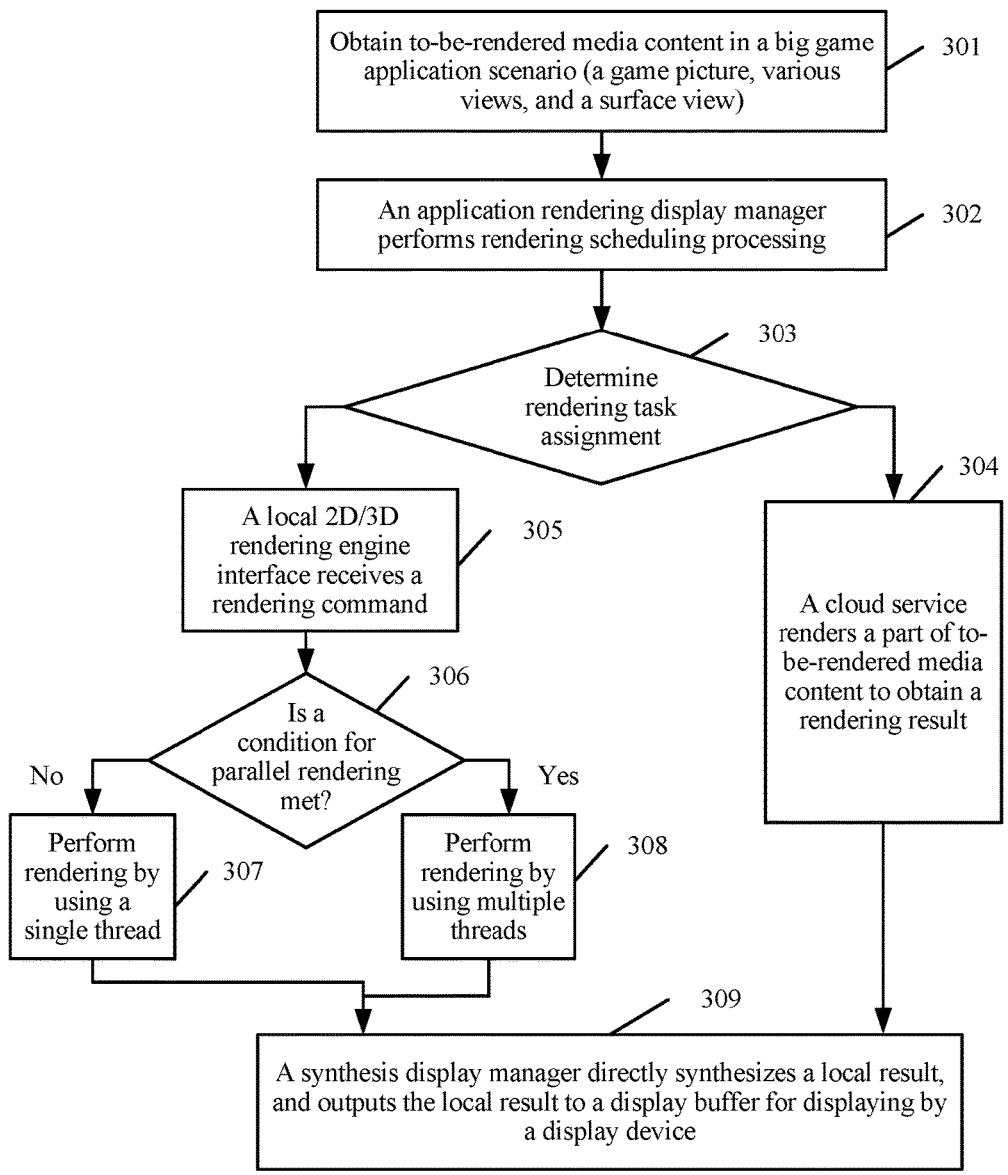
FIG. 5 is a schematic diagram of another embodiment of a media content rendering method according to an embodiment of the present disclosure.

FIG. 5 is a schematic diagram of another embodiment of a media content rendering method according to an embodiment of the present disclosure. To-be-rendered content in the embodiment shown in FIG. 5 is described by using a big game application scenario as an example. A media content rendering process shown in FIG. 5 includes the following steps.

301. Obtain to-be-rendered media content in the big game application scenario.

The to-be-rendered media content in the big game application scenario may include a game picture, various views, and a surface view.

302. An application rendering display manager performs rendering scheduling processing.

303. Determine rendering task assignment.

On an android platform, during game development, a display picture is generally presented by using various views, or the surface view, or a glSurface view. Various types of texture information that is of the display picture and that needs to be displayed is stored by a canvas buffer. When a game runs, some complex pictures are presented by using the surface view or the glSurface view, and other information such as a simple text may be presented by using a view. Therefore, for simplicity, whether a type of a layer is the surface view or the glSurface view is directly determined, and if the type of the layer is the surface view or the glSurface view, the layer is scheduled to a cloud for rendering.

Steps 304 to 309 are the same as steps 104 to 109 in the embodiment corresponding to FIG. 3, and details are not described herein again.

Only some special descriptions are provided for the game scenario. Because all game content is drawn by using a texture, various textures need to be drawn in this scenario. In the industry, to reduce graphic display bandwidth, all general display processors support a texture compression format. Therefore, before synchronization to the cloud, game content may be packed and compressed in advance in a texture compression format supported by the cloud, so as to reduce a network transmission data volume; or certainly, the game content may also be processed by the cloud. Another processing mode is consistent with a processing procedure in the embodiment corresponding to FIG. 3. In addition, because a game is very sensitive to interaction, high picture smoothness is desired. Therefore, a delay of texture rendering of each picture may be not less than 16 milliseconds (60 fps); that is, the following operations need to be completed within 16 ms preparing a to-be-rendered picture by an application program, encrypting and packing the picture, transmitting the picture to a cloud device by using a network, checking and decrypting the picture by the cloud device, completing parallel rendering on the picture, returning a rendering result to the a user equipment by using the network, synthesizing the rendering result, and finally outputting the rendering result to a display screen for displaying. Compared with a local rendering mode, in the cloud rendering mode, the network transmission performed twice brings an extra delay. Therefore, an advantage of rendering by the cloud device needs to overweigh the extra delay, so that rendering by the cloud may be valuable. A simple example is given herein. If one FHD picture frame needs to be rendered, approximately a data volume of 1920×1080×3=6220800 bytes may be required. When a current 4G network (or a Wi-Fi or 5G network or some other wireless network) is used for transmission, if it is assumed that network bandwidth is 300 Mbps, it costs approximate 166 ms to transmit the foregoing data volume twice. This efficiency is far behind a real-time rendering requirement. Therefore, a manner of parallel upload and parallel download can be used for processing. Considering that a size of a tile processed by a GPU is generally 256 bit×256 bit, and taking a delay brought by a local CPU network link into consideration, this size is selected as a size of a tile to be rendered by the cloud device. Therefore, one full high definition (FHD) picture frame may be approximately divided into 32 titles of such a size in advance, and then transmitted to the cloud device in parallel for rendering. In this case, a round-trip delay is about 5.2 ms. This data is basically acceptable. However, compared with 16 ms, the extra delay is still too high. Therefore, it is considered that a compression format is used to reduce impact imposed by network transmission. For example, time may be reduced to ¼ of the original time when a latest ASTC compression format is used for transmission; that is, in this case, a delay brought by the transmission is about 1.3 ms, which can be ignored when compared with 16 ms of displaying one image frame. Therefore, when such a policy is used, a client-cloud collaborative rendering solution becomes possible. In addition, high-speed network communication is an essential condition. In the future 5G network era, the client-cloud collaborative rendering solution will be more widely used.

According to the media content rendering method provided in this embodiment of the present disclosure, because a cloud device can perform real-time rendering, costs of a user equipment can be significantly reduced without degrading user experience. Because a powerful rendering device of a cloud is used to render a complex to-be-rendered scenario on the cloud, the user equipment can be simplified, and even currently common GPU hardware of the user equipment can be removed, so as to reduce the costs of the user equipment without affecting user experience.

Further, a render farm technology in some approaches can perform offline rendering for a file. However, in the media content rendering method provided in this embodiment of the present disclosure, a result of high-speed rendering of the cloud is returned to the user equipment in real time by using a high-speed network parallel transmission technology and a highly reliable and general compression technology, so that rendering is implemented.

Further, in this application, the rendering by the cloud may be performed for a specific task such as a specific layer, view, or texture, an advantage of cloud computing is leveraged to quickly perform rendering, which improves user experience.

In the future 4G/5G era when a data transmission delay of a client-cloud link is not a problem, advantage of the present disclosure may be significantly leveraged to deliver perfect user experience. In addition, the present disclosure is not limited to be applied only in the terminal field, and may be further applied in a desktop system and a cloud office system. In a client-cloud collaborative process, key technologies such as a data reliability technology, a security technology, and a high-speed data transmission technology may also be applied in the network communication field.

Figure 6:
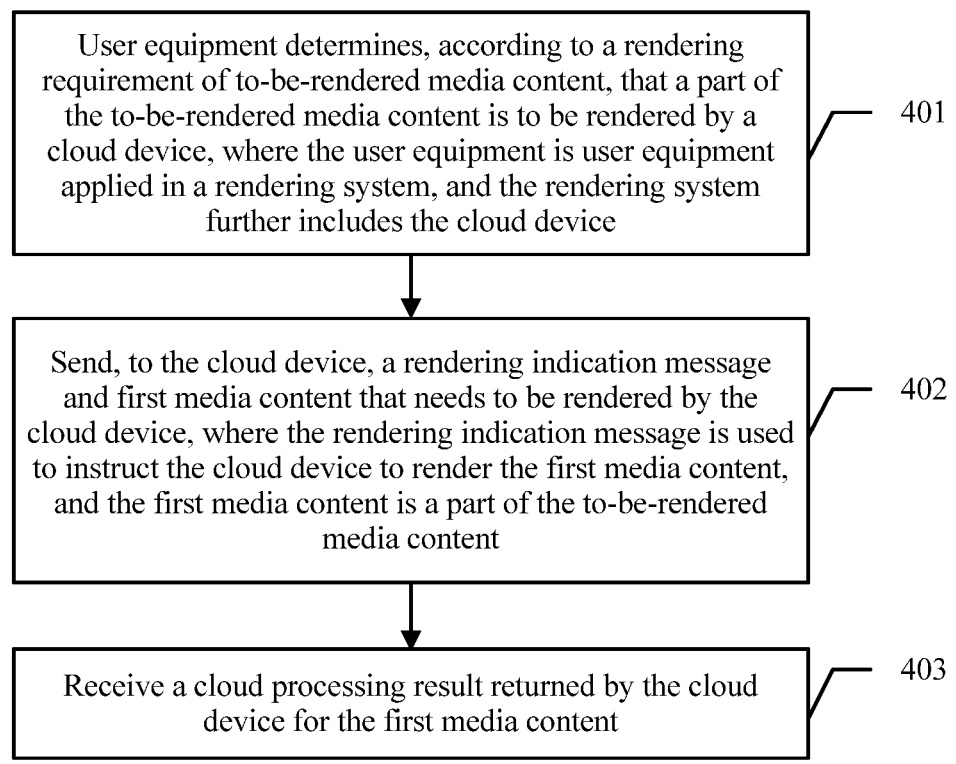
FIG. 6 is a schematic diagram of another embodiment of a media content rendering method according to an embodiment of the present disclosure.

Referring to FIG. 6, an embodiment of a media content rendering method according to an embodiment of the present disclosure includes the following steps.

401. A user equipment determines, according to a rendering requirement of to-be-rendered media content, that a part of the to-be-rendered media content is to be rendered by a cloud device, where the user equipment is applied in a rendering system, and the rendering system further includes the cloud device.

402. Send, to the cloud device, a rendering indication message and first media content that needs to be rendered by the cloud device, where the rendering indication message is used to instruct the cloud device to render the first media content, and the first media content is a part of the to-be-rendered media content.

The first media content is a part of the to-be-rendered media content, that is, the first media content is a subset of the to-be-rendered media content. In this embodiment of the present disclosure, the first media content does not include all to-be-rendered media content.

403. Receive a cloud processing result returned by the cloud device for the first media content.

The media content rendering method provided in this embodiment of the present disclosure is applied in a user equipment in a rendering system. The rendering system further includes a cloud device. The method includes determining, according to a rendering requirement of to-be-rendered media content, that a part of the to-be-rendered media content is to be rendered by the cloud device; sending, to the cloud device, a rendering indication message and first media content that needs to be rendered by the cloud device, where the rendering indication message is used to instruct the cloud device to render the first media content, and the first media content is a part of the to-be-rendered media content; and receiving a cloud processing result returned by the cloud device for the first media content. Unlike media content rendering efficiency in some approaches, according to the media content rendering method provided in the embodiments of the present disclosure, the a user equipment can perform collaborative rendering with the cloud device for the to-be-rendered media content. The to-be-rendered media content is jointly rendered by the a user equipment and the cloud device, so that rendering resources of the a user equipment and the cloud device are effectively used, and the media content rendering efficiency is improved.

Optionally, based on the foregoing embodiment corresponding to FIG. 6, in a first optional embodiment of the media content rendering method provided in this embodiment of the present disclosure, the method may further include carrying, by the rendering indication message, a rendering requirement parameter for the first media content, where the rendering requirement parameter is used to instruct the cloud device to render the first media content according to the rendering requirement parameter.

In this embodiment of the present disclosure, the rendering requirement parameter may be a resolution of a display device on the a user equipment. In this case, the cloud device may obtain, by means of direct rendering, a rendering result that matches the display device of the a user equipment, so that rendering is implemented according to a requirement of the a user equipment. It should be noted that the rendering requirement parameter may also be another parameter that indicates a hardware condition of the a user equipment. On one hand, the parameter may ensure that the rendering result obtained by means of rendering by the cloud device may meet an image processing requirement of to-be-rendered content; on the other hand, the parameter may ensure that the rendering result is compatible with the hardware condition of the a user equipment (that is, direct processing is performed, for example, quick synthesis or direct displaying is performed without a need of conversion), so as to avoid an occurrence of delay, frame freezing, and the like. A specific form of the rendering requirement parameter is not limited in this embodiment of the present disclosure.

Optionally, based on the foregoing embodiment corresponding to FIG. 6 or the first optional embodiment, in a second optional embodiment of the media content rendering method provided in this embodiment of the present disclosure, the method may further include rendering second media content to obtain a rendering result of the second media content, where the second media content is remaining media content in the to-be-rendered media content except the first media content; and synthesizing the cloud processing result and the rendering result of the second media content to obtain a synthesis result of the to-be-rendered media content, where the cloud processing result is a rendering result of the first media content.

In this embodiment of the present disclosure, a synthesis process is a process of stitching and/or superimposing layers. When all layers belong to different regions of an image to be finally displayed, all layers are stitched. When two or more layers belong to a same region, layers belonging to the same region are superimposed, and layers belonging to different regions are stitched. The synthesis result is a finally displayed image of the to-be-rendered media content, for example, an application icon interface of a mobile phone.

Optionally, based on the foregoing embodiment corresponding to FIG. 6 or the first optional embodiment, in a third optional embodiment of the media content rendering method provided in this embodiment of the present disclosure, the method may further include rendering second media content to obtain a rendering result of the second media content, where the second media content is remaining media content in the to-be-rendered media content except the first media content; and synthesizing the cloud processing result and the rendering result of the second media content to obtain a synthesis result of the to-be-rendered media content, where the cloud processing result is obtained by synthesizing multiple layers in a rendering result of the first media content by the cloud device.

In this embodiment of the present disclosure, the cloud device may synthesize the multiple layers in the rendering result of the first media content according to a preset configuration or according to a synthesis instruction of the a user equipment. Because the cloud device has a powerful processing capability, a synthesis speed can be increased by means of cloud synthesis, so that a display speed is finally increased.

Optionally, based on any one of the foregoing embodiment corresponding to FIG. 6, or the first to the third optional embodiments, in a fourth optional embodiment of the media content rendering method provided in this embodiment of the present disclosure, before the sending, to the cloud device, a rendering indication message and first media content that needs to be rendered by the cloud device, the method may further include compressing the first media content to obtain compressed media content; where the sending, to the cloud device, a rendering indication message and first media content that needs to be rendered by the cloud device may include sending the rendering indication message and the compressed media content to the cloud device.

In this embodiment of the present disclosure, a transmission speed can be increased when the first media content is compressed before being transmitted, so that rendering efficiency is further improved.

Optionally, based on any one of the foregoing embodiment corresponding to FIG. 6, or the first to the third optional embodiments, in a fifth optional embodiment of the media content rendering method provided in this embodiment of the present disclosure, before the sending, to the cloud device, a rendering indication message and first media content that needs to be rendered by the cloud device, the method may further include encrypting the first media content to obtain encrypted media content; where the sending, to the cloud device, a rendering indication message and first media content that needs to be rendered by the cloud device may include sending the rendering indication message and the encrypted media content to the cloud device.

In this embodiment of the present disclosure, transmission security can be improved when the first media content is encrypted before being transmitted.

Optionally, based on any one of the foregoing embodiment corresponding to FIG. 6, or the first to the third optional embodiments, in a sixth optional embodiment of the media content rendering method provided in this embodiment of the present disclosure, before the sending, to the cloud device, a rendering indication message and first media content that needs to be rendered by the cloud device, the method may further include performing double processing, that is, encryption and compression, on the first media content to obtain double-processed media content; where the sending, to the cloud device, a rendering indication message and first media content that needs to be rendered by the cloud device may include sending the rendering indication message and the double-processed media content to the cloud device.

In this embodiment of the present disclosure, both security and transmission efficiency are improved when the first media content is double processed, that is, encrypted and compressed, before being transmitted.

Optionally, based on the foregoing second or third optional embodiment, in a seventh optional embodiment of the media content rendering method provided in this embodiment of the present disclosure, the rendering second media content to obtain a rendering result of the second media content may include rendering, according to a quantity of cores of the user equipment, the second media content by using multiple threads corresponding to the quantity of cores, so as to obtain the rendering result of the second media content.

In this embodiment of the present disclosure, if rendering is to be performed by the user equipment and the user equipment is a multi-core device, the rendering may be performed by using multiple threads, which improves efficiency of local rendering.

To understand a solution that is provided in the embodiment or the optional embodiment corresponding to FIG. 6 and in which the client and the cloud perform collaborative rendering on a part of to-be-rendered media content, refer to descriptions of the related client-cloud collaborative solution in FIG. 1 to FIG. 5, and details are not described herein again.

Figure 7:
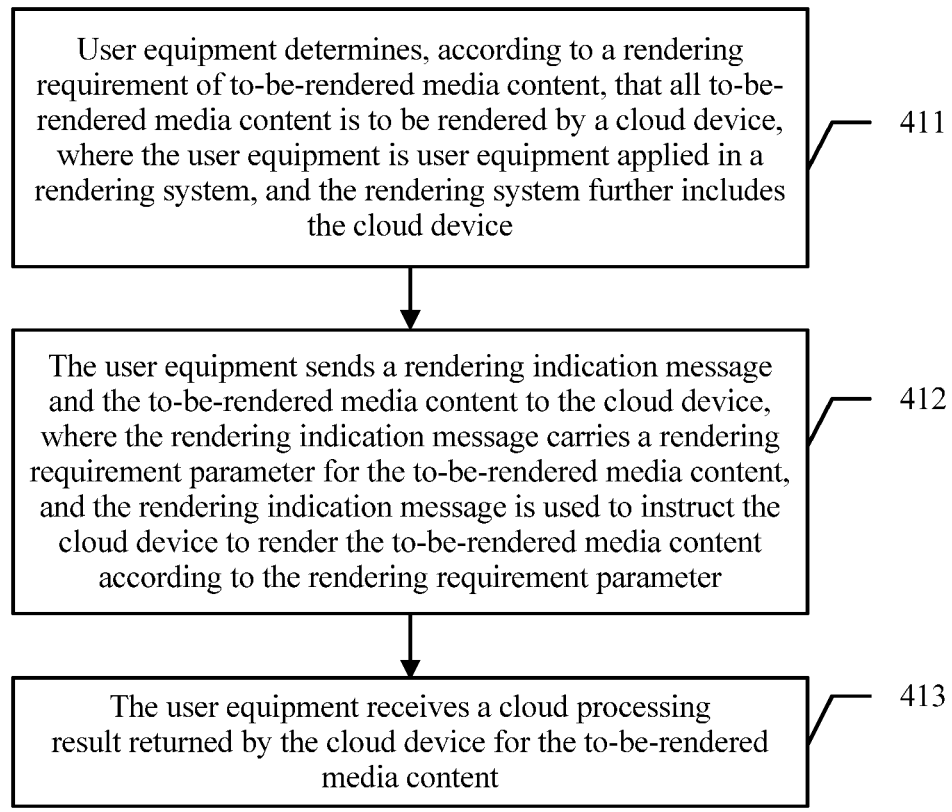
FIG. 7 is a schematic diagram of another embodiment of a media content rendering method according to an embodiment of the present disclosure.

Referring to FIG. 7, another embodiment of a media content rendering method according to an embodiment of the present disclosure includes the following steps.

411. A user equipment determines, according to a rendering requirement of to-be-rendered media content, that all to-be-rendered media content is to be rendered by a cloud device, where the user equipment is applied in a rendering system, and the rendering system further includes the cloud device.

412. The user equipment sends a rendering indication message and the to-be-rendered media content to the cloud device, where the rendering indication message carries a rendering requirement parameter for the to-be-rendered media content, and the rendering indication message is used to instruct the cloud device to render the to-be-rendered media content according to the rendering requirement parameter.

413. The user equipment receives a cloud processing result returned by the cloud device for the to-be-rendered media content.

In this embodiment of the present disclosure, the rendering requirement parameter may be a resolution of a display device on the user equipment. In this case, the cloud device may obtain, by means of direct rendering, a rendering result that matches the display device of the user equipment, so that rendering is implemented according to a requirement of the user equipment. It should be noted that the rendering requirement parameter may also be another parameter that indicates a hardware condition of the user equipment. On one hand, the parameter may ensure that the rendering result obtained by means of rendering by the cloud device may meet an image processing requirement of to-be-rendered content; on the other hand, the parameter may ensure that the rendering result is compatible with the hardware condition of the user equipment (that is, direct processing is performed, for example, quick synthesis or direct displaying is performed without a need of conversion), so as to avoid an occurrence of delay, frame freezing, and the like. A specific form of the rendering requirement parameter is not limited in this embodiment of the present disclosure.

In this embodiment of the present disclosure, it is determined, according to the rendering requirement of the to-be-rendered media content, that all to-be-rendered media content is to be rendered by the cloud device; the rendering indication message and the to-be-rendered media content are sent to the cloud device, where the rendering indication message carries the rendering requirement parameter for the to-be-rendered media content, and the rendering indication message is used to instruct the cloud device to render the to-be-rendered media content according to the rendering requirement parameter; and the cloud processing result returned by the cloud device for the to-be-rendered media content is received. Unlike media content rendering efficiency in some approaches, according to the media content rendering method provided in this embodiment of the present disclosure, after the user equipment learns the to-be-rendered media content, customization can be performed according to hardware performance of the user equipment, and the to-be-rendered media content is sent to the cloud device, so that the cloud device performs rendering according to the rendering requirement parameter. In this way, the user equipment collaborates or cooperates with the cloud device, and the cloud device obtains, by means of rendering according to the rendering requirement parameter, a rendering result that meets a requirement of a user equipment, which not only improves media content rendering efficiency, but also implements personalized rendering customization.

Optionally, based on the embodiment corresponding to FIG. 7, in a first optional embodiment of the media content rendering method provided in this embodiment of the present disclosure, the cloud processing result is a rendering result of the to-be-rendered media content; and the method may further include synthesizing multiple layers in the rendering result of the to-be-rendered media content to obtain a synthesis result of the to-be-rendered media content.

In this embodiment of the present disclosure, when a cloud does not synthesize the rendering result, the user equipment synthesizes the multiple layers in the rendering result of the to-be-rendered media content.

Optionally, based on the embodiment corresponding to FIG. 7 or the first optional embodiment, in a second optional embodiment of the media content rendering method provided in this embodiment of the present disclosure, before the sending a rendering indication message and the to-be-rendered media content to the cloud device, the method may further include compressing the to-be-rendered media content to obtain compressed media content; where the sending a rendering indication message and the to-be-rendered media content to the cloud device may include sending the rendering indication message and the compressed media content to the cloud device.

In this embodiment of the present disclosure, transmission efficiency can be improved when compression is performed before transmission.

Optionally, based on the embodiment corresponding to FIG. 7 or the first optional embodiment, in a third optional embodiment of the media content rendering method provided in this embodiment of the present disclosure, before the sending a rendering indication message and the to-berendered media content to the cloud device, the method may further include encrypting the to-be-rendered media content to obtain encrypted media content; where the sending a rendering indication message and the to-be-rendered media content to the cloud device may include sending the rendering indication message and the encrypted media content to the cloud device.

In this embodiment of the present disclosure, transmission security can be improved when transmission is performed after encryption.

Optionally, based on the embodiment corresponding to FIG. 7 or the first optional embodiment, in a fourth optional embodiment of the media content rendering method provided in this embodiment of the present disclosure, before the sending a rendering indication message and the to-be-rendered media content to the cloud device, the method may further include performing double processing, that is, encryption and compression, on the to-be-rendered media content to obtain double-processed media content; where the sending a rendering indication message and the to-be-rendered media content to the cloud device may include sending the rendering indication message and the double-processed media content to the cloud device.

In this embodiment of the present disclosure, both transmission security and transmission efficiency can be improved when transmission is performed after the double processing, that is, the encryption and the compression.

To understand a solution that is provided in the embodiment or the optional embodiment corresponding to FIG. 7 and in which the cloud device assists the user equipment in rendering all to-be-rendered media content, refer to descriptions of the related client-cloud collaborative solution in FIG. 1 to FIG. 5, and details are not described herein again.

Figure 8:
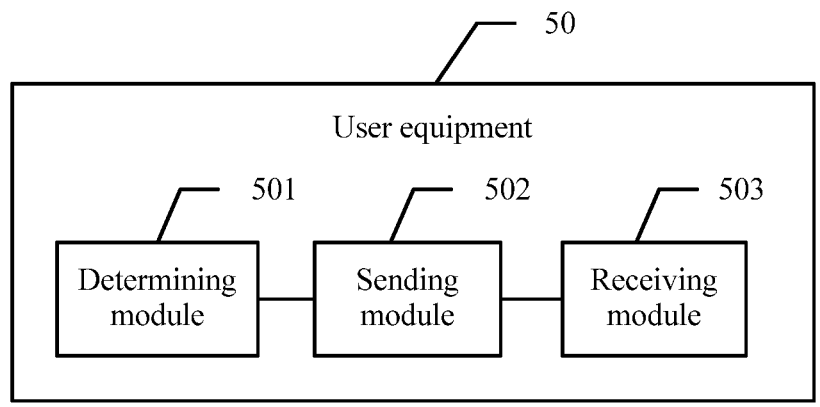
FIG. 8 is a schematic diagram of an embodiment of a user equipment according to an embodiment of the present disclosure.

Referring to FIG. 8, in an embodiment of user equipment according to an embodiment of the present disclosure, the user equipment is applied in a rendering system. The rendering system further includes a cloud device. The user equipment 50 includes a determining module 501 configured to determine, according to a rendering requirement of to-be-rendered media content, that a part of the to-be-rendered media content is to be rendered by the cloud device; a sending module 502 configured to send to the cloud device, after the determining module 501 determines that a part of the to-be-rendered media content is to be rendered by the cloud device, a rendering indication message and first media content that needs to be rendered by the cloud device, where the rendering indication message is used to instruct the cloud device to render the first media content, and the first media content is a part of the to-be-rendered media content; and a receiving module 503 configured to after the sending module 502 sends the rendering indication message and the first media content that needs to be rendered by the cloud device, receive a cloud processing result returned by the cloud device for the first media content.

The user equipment provided in this embodiment of the present disclosure is applied in a rendering system. The rendering system further includes a cloud device. The user equipment 50 includes the determining module 501 that determines, according to a rendering requirement of to-be-rendered media content, that a part of the to-be-rendered media content is to be rendered by the cloud device; the sending module 502 that sends to the cloud device, after the determining module 501 determines that a part of the to-be-rendered media content is to be rendered by the cloud device, the rendering indication message and the first media content that needs to be rendered by the cloud device, where the rendering indication message is used to instruct the cloud device to render the first media content, and the first media content is a part of the to-be-rendered media content; and the receiving module 503 that receives, after the sending module 502 sends the rendering indication message and the first media content that needs to be rendered by the cloud device, the cloud processing result returned by the cloud device for the first media content. Unlike media content rendering efficiency in some approaches, the user equipment provided in this embodiment of the present disclosure can perform collaborative rendering with the cloud device for the to-be-rendered media content. The to-be-rendered media content is jointly rendered by the user equipment and the cloud device, so that rendering resources of the user equipment and the cloud device are effectively used, and media content rendering efficiency is improved.

Optionally, based on the foregoing embodiment corresponding to FIG. 8, in a first optional embodiment of the user equipment provided in this embodiment of the present disclosure, the rendering indication message carries a rendering requirement parameter for the first media content, and the rendering requirement parameter is used to instruct the cloud device to render the first media content according to the rendering requirement parameter.

Figure 9:
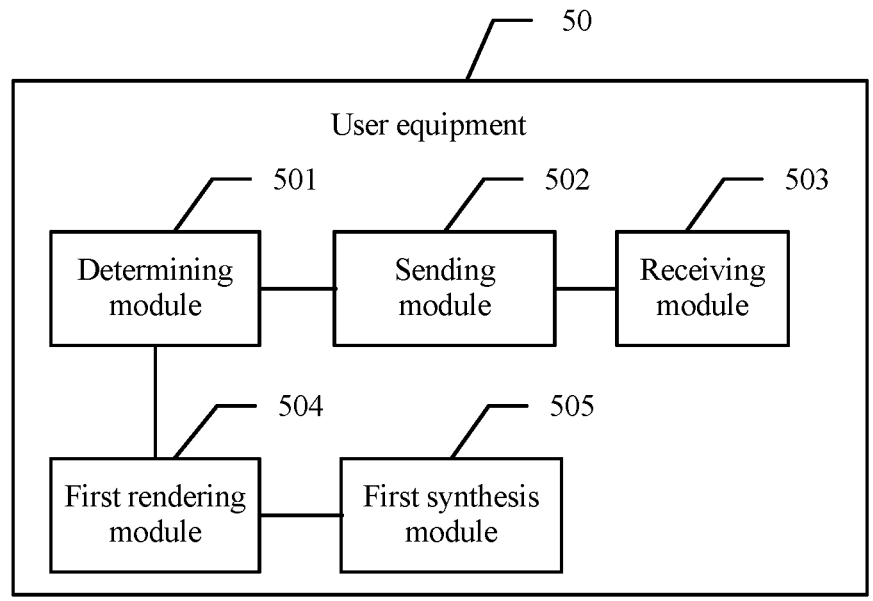
FIG. 9 is a schematic diagram of another embodiment of a user equipment according to an embodiment of the present disclosure.

Optionally, based on the foregoing embodiment corresponding to FIG. 8 or the first optional embodiment, in a second optional embodiment of the user equipment provided in this embodiment of the present disclosure, referring to FIG. 9, the user equipment 50 further includes a first rendering module 504 configured to render second media content to obtain a rendering result of the second media content, where the second media content is remaining media content in the to-be-rendered media content except the first media content sent by the sending module 502; and a first synthesis module 505 configured to synthesize the cloud processing result received by the receiving module 503 and the rendering result of the second media content rendered by the first rendering module 504, so as to obtain a synthesis result of the to-be-rendered media content, where the cloud processing result is a rendering result of the first media content.

Figure 10:
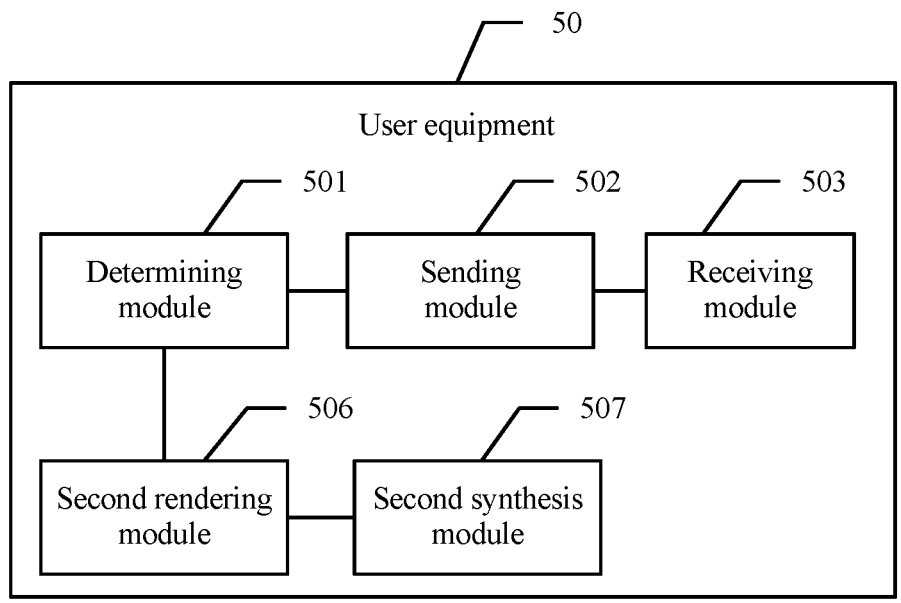
FIG. 10 is a schematic diagram of another embodiment of a user equipment according to an embodiment of the present disclosure.

Optionally, based on the foregoing embodiment corresponding to FIG. 8 or the first optional embodiment, in a third optional embodiment of the user equipment provided in this embodiment of the present disclosure, referring to FIG. 10, the user equipment 50 further includes a second rendering module 506 configured to when the sending module 502 sends the rendering indication message and the first media content that needs to be rendered by the cloud device, render second media content to obtain a rendering result of the second media content, where the second media content is remaining media content in the to-be-rendered media content except the first media content sent by the sending module 502; and a second synthesis module 507 configured to synthesize the cloud processing result received by the receiving module 503 and the rendering result of the second media content rendered by the second rendering module 506, so as to obtain a synthesis result of the to-be-rendered media content, where the cloud processing result is obtained by synthesizing multiple layers in a rendering result of the first media content by the cloud device.

In this embodiment of the present disclosure, it should be understood that in some cases, the first rendering module 504 and the second rendering module 506 may be a same module, and the first synthesis module 505 and the second synthesis module 507 may also be a same module; only different functions are implemented according to the cloud processing result.

Figure 11:
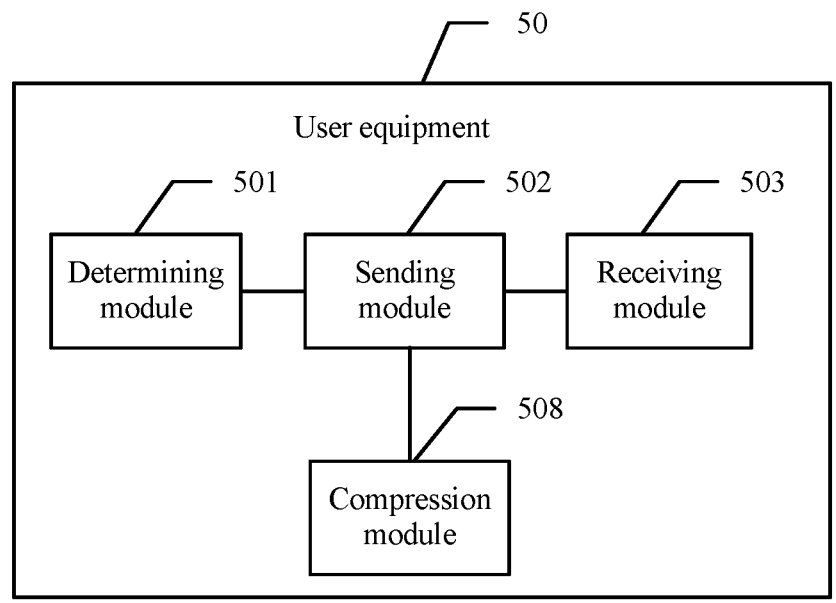
FIG. 11 is a schematic diagram of another embodiment of a user equipment according to an embodiment of the present disclosure.

Optionally, based on any one of the foregoing embodiment corresponding to FIG. 8, or the first to the third optional embodiments, in a fourth optional embodiment of the user equipment provided in this embodiment of the present disclosure, referring to FIG. 11, the user equipment 50 further includes a compression module 508; where the compression module 508 is configured to before the sending module 502 sends the rendering indication message and the first media content that needs to be rendered by the cloud device, compress the first media content to obtain compressed media content; and the sending module 502 is configured to send, to the cloud device, the rendering indication message and the media content that is compressed by the compression module 508.

Figure 12:
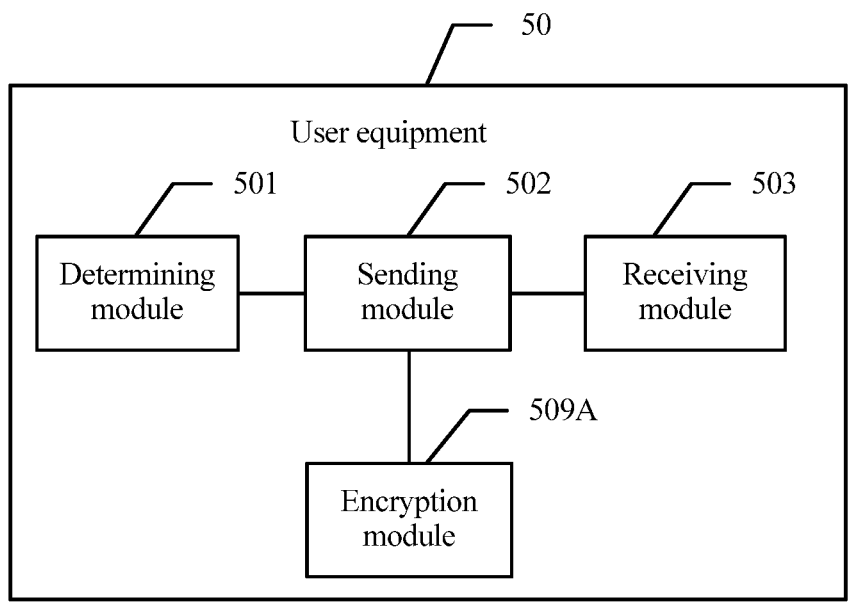
FIG. 12 is a schematic diagram of another embodiment of a user equipment according to an embodiment of the present disclosure.

Optionally, based on any one of the foregoing embodiment corresponding to FIG. 8, or the first to the third optional embodiments, in a fifth optional embodiment of the user equipment provided in this embodiment of the present disclosure, referring to FIG. 12, the user equipment 50 further includes an encryption module 509A; where the encryption module 509A is configured to before the sending module 502 sends the rendering indication message and the first media content that needs to be rendered by the cloud device, encrypt the first media content to obtain encrypted media content; and the sending module 502 is configured to send, to the cloud device, the rendering indication message and the media content that is encrypted by the encryption module 509A.

Figure 13:
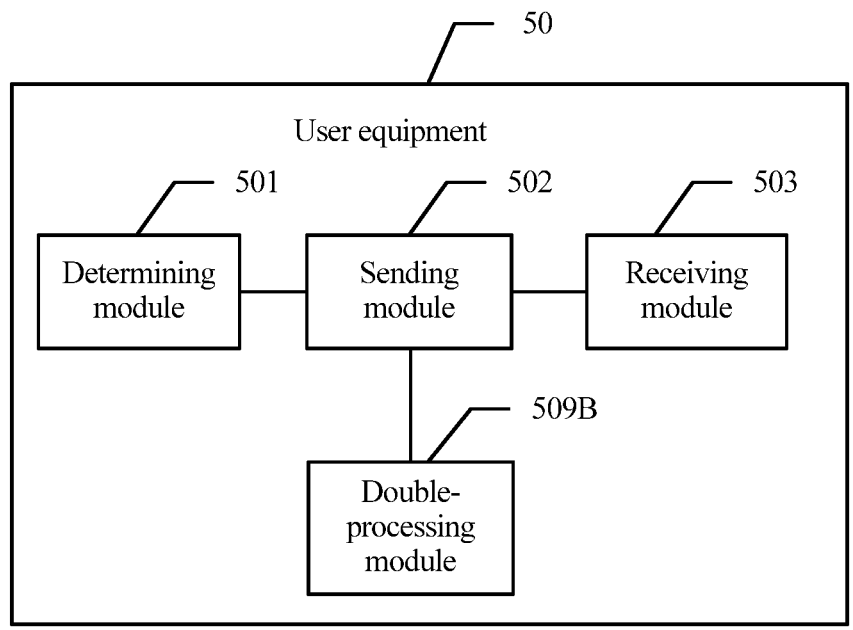
FIG. 13 is a schematic diagram of another embodiment of a user equipment according to an embodiment of the present disclosure.

Optionally, based on any one of the foregoing embodiment corresponding to FIG. 8, or the first to the third optional embodiments, in a sixth optional embodiment of the user equipment provided in this embodiment of the present disclosure, referring to FIG. 13, the user equipment 50 further includes a double-processing module 509B; where the double-processing module 509B is configured to before the sending module 502 sends the rendering indication message and the first media content that needs to be rendered by the cloud device, perform double processing, that is, encryption and compression, on the first media content to obtain double-processed media content; and the sending module 502 is configured to send, to the cloud device, the rendering indication message and the media content that is double processed by the double-processing module 509B.

Optionally, based on the foregoing second optional embodiment corresponding to FIG. 9, in a seventh optional embodiment of the user equipment provided in this embodiment of the present disclosure, the first rendering module 504 is configured to render, according to a quantity of cores of the user equipment, the second media content by using multiple threads corresponding to the quantity of cores, so as to obtain the rendering result of the second media content.

Optionally, based on the foregoing third optional embodiment corresponding to FIG. 10, in an eighth optional embodiment of the user equipment provided in this embodiment of the present disclosure, the first rendering module 506 is configured to render, according to a quantity of cores of the user equipment, the second media content by using multiple threads corresponding to the quantity of cores, so as to obtain the rendering result of the second media content.

To understand the embodiments or the optional embodiments corresponding to FIG. 8 to FIG. 13, refer to descriptions of the related client-cloud collaborative solution in multiple embodiments and optional embodiments in FIG. 1 to FIG. 6, and details are not described herein again.

Figure 14:
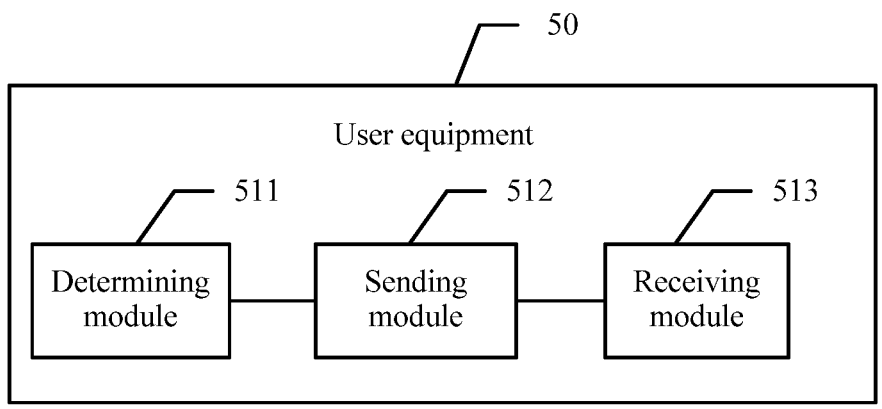
FIG. 14 is a schematic diagram of another embodiment of a user equipment according to an embodiment of the present disclosure.

Referring to FIG. 14, in another embodiment of user equipment according to an embodiment of the present disclosure, a user equipment 50 is applied in a rendering system. The rendering system further includes a cloud device. The user equipment 50 includes a determining module 511 configured to determine, according to a rendering requirement of to-be-rendered media content, that all to-be-rendered media content is to be rendered by a cloud device; a sending module 512 configured to when the determining module 511 determines that all to-be-rendered media content is to be rendered by the cloud device, send a rendering indication message and the to-be-rendered media content to the cloud device, where the rendering indication message carries a rendering requirement parameter for the to-be-rendered media content, and the rendering indication message is used to instruct the cloud device to render the to-be-rendered media content according to the rendering requirement parameter; and a receiving module 513 configured to after the sending module 512 sends the rendering indication message and the to-be-rendered media content, receive a cloud processing result returned by the cloud device for the to-be-rendered media content.

In this embodiment of the present disclosure, the determining module 511 determines, according to the rendering requirement of the to-be-rendered media content, that all to-be-rendered media content is to be rendered by the cloud device; the sending module 512 sends, when the determining module 511 determines that all to-be-rendered media content is to be rendered by the cloud device, the rendering indication message and the to-be-rendered media content to the cloud device, where the rendering indication message carries the rendering requirement parameter for the to-be-rendered media content, and the rendering indication message is used to instruct the cloud device to render the to-be-rendered media content according to the rendering requirement parameter; and the receiving module 513 receives, after the sending module 512 sends the rendering indication message and the to-be-rendered media content, the cloud processing result returned by the cloud device for the to-be-rendered media content. Unlike media content rendering efficiency in some approaches, after the user equipment provided in this embodiment of the present disclosure learns the to-be-rendered media content, customization can be performed according to hardware performance of the user equipment, and the to-be-rendered media content is sent to the cloud device. The cloud device obtains, by means of rendering according to the rendering requirement parameter, a rendering result that meets a requirement of the user equipment. In this way, the user equipment collaborates or cooperates with the cloud device, and the cloud device completes rendering, which not only improves media content rendering efficiency, but also implements personalized rendering customization.

Figure 15:
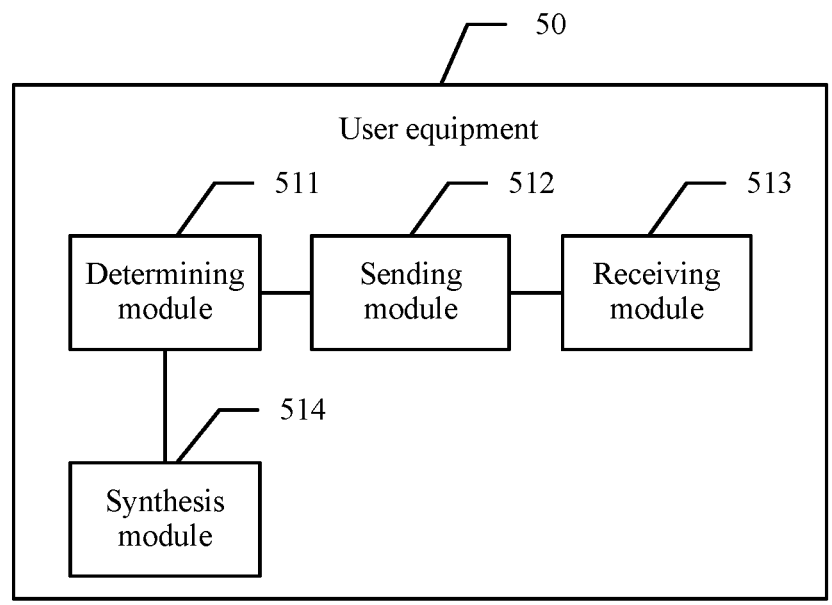
FIG. 15 is a schematic diagram of another embodiment of a user equipment according to an embodiment of the present disclosure.

Optionally, based on the foregoing embodiment corresponding to FIG. 14, referring to FIG. 15, in a second optional embodiment of the user equipment 50 provided in this embodiment of the present disclosure, the user equipment 50 further includes a synthesis module 514 configured to synthesize multiple layers in a rendering result that is of the to-be-rendered media content and that is received by the receiving module 513, so as to obtain a synthesis result of the to-be-rendered media content.

Figure 16:
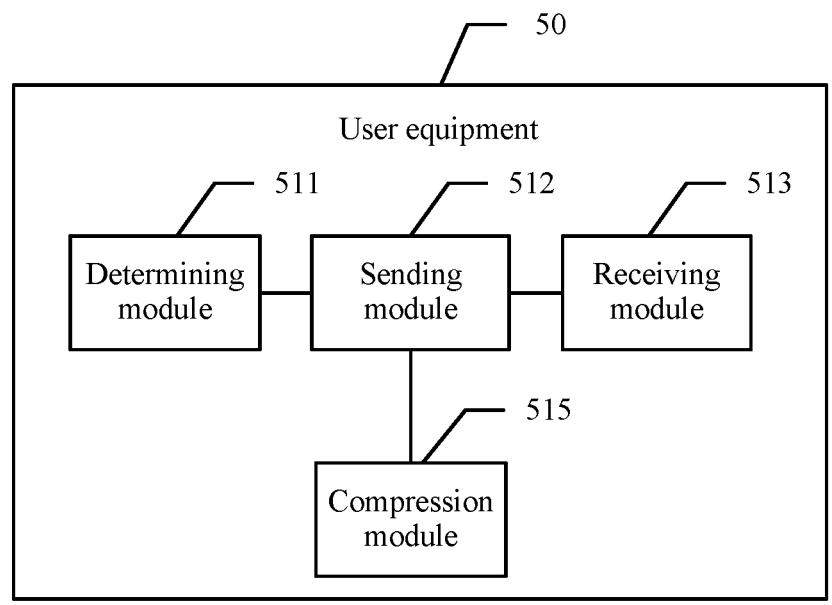
FIG. 16 is a schematic diagram of another embodiment of a user equipment according to an embodiment of the present disclosure.

Optionally, based on the foregoing embodiment corresponding to FIG. 14, referring to FIG. 16, in a second optional embodiment of the user equipment 50 provided in this embodiment of the present disclosure, the user equipment 50 further includes a compression module 515; where the compression module 515 is configured to before the sending module 512 sends the rendering indication message and the to-be-rendered media content to the cloud device, compress the to-be-rendered media content to obtain compressed media content; and the sending module 512 is configured to send, to the cloud device, the rendering indication message and the media content that is compressed by the compression module 515.

Optionally, based on the optional embodiment corresponding to FIG. 15, the user equipment 50 may also include the foregoing compression module 515.

Figure 17:
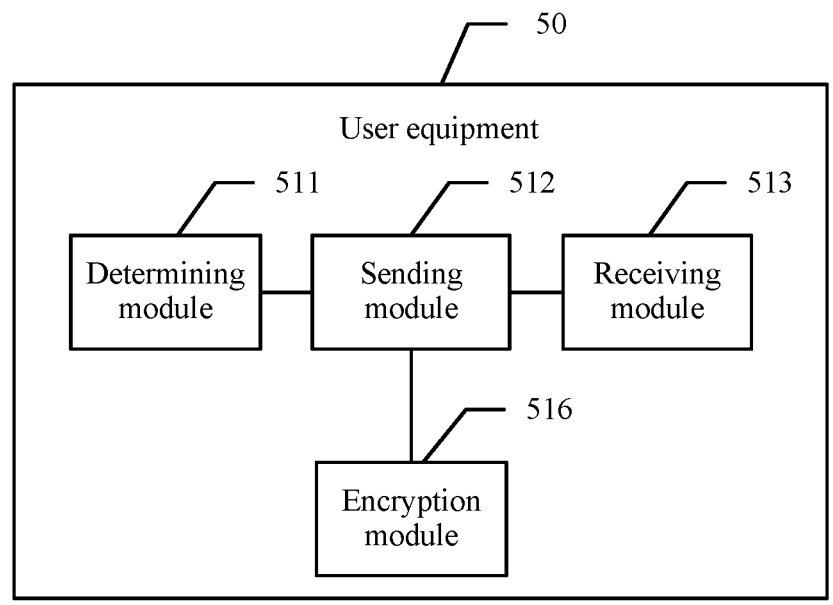
FIG. 17 is a schematic diagram of another embodiment of a user equipment according to an embodiment of the present disclosure.

Optionally, based on the foregoing embodiment corresponding to FIG. 14, referring to FIG. 17, in a third optional embodiment of the user equipment 50 provided in this embodiment of the present disclosure, the user equipment 50 further includes an encryption module 516; where the encryption module 516 is configured to before the sending module 512 sends the rendering indication message and the to-be-rendered media content to the cloud device, encrypt the to-be-rendered media content to obtain encrypted media content; and the sending module 512 is configured to send, to the cloud device, the rendering indication message and the media content that is encrypted by the encryption module 516.

Optionally, based on the optional embodiment corresponding to FIG. 15, the user equipment may also include the foregoing encryption module.

Figure 18:
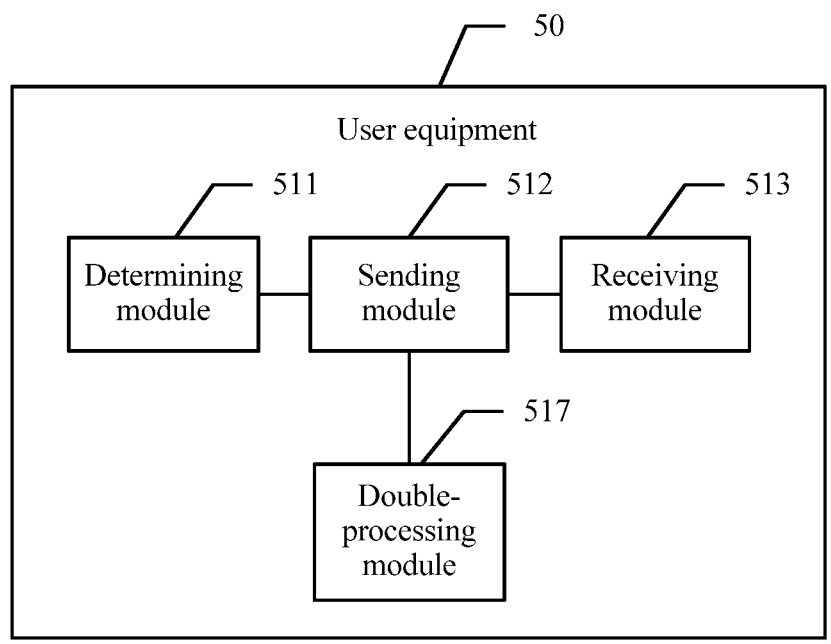
FIG. 18 is a schematic diagram of another embodiment of a user equipment according to an embodiment of the present disclosure.

Optionally, based on the foregoing embodiment corresponding to FIG. 14, referring to FIG. 18, in a fourth optional embodiment of the user equipment 50 provided in this embodiment of the present disclosure, the user equipment further includes a double-processing module 517; where the double-processing module 517 is configured to before the sending module 512 sends the rendering indication message and the to-be-rendered media content to the cloud device, perform double processing, that is, encryption and compression, on the to-be-rendered media content to obtain double-processed media content; and the sending module 512 is configured to send, to the cloud device, the rendering indication message and the media content that is double processed by the double-processing module 517.

Optionally, based on the optional embodiment corresponding to FIG. 15, the user equipment may also include the foregoing double-processing module.

To understand the embodiments or the optional embodiments corresponding to FIG. 14 to FIG. 18, refer to descriptions of the related client-cloud collaborative solution in multiple embodiments and optional embodiments in FIG. 1 to FIG. 5 and FIG. 7, and details are not described herein again.

In multiple embodiments of the foregoing a user equipment, it should be understood that in an implementation manner, a sending module and a receiving module may be implemented by an (I/O) device (for example, a network adapter), and a determining module, a compression module, an encryption module, a rendering module, and a synthesis module may be implemented by executing a program or an instruction in a memory by the processor (that is, the modules may be implemented by means of collaboration between the processor and special instructions in the memory coupled with the processor). In another implementation manner, a sending module and a receiving module may be implemented by an I/O device (for example, a network adapter), and a determining module, a compression module, an encryption module, a rendering module, and a synthesis module may also be separately implemented by using a dedicated circuit; for a specific implementation manner, refer to some approaches, and details are not described herein. In still another implementation manner, a sending module and a receiving module may be implemented by an I/O device (for example, a network adapter), and a determining module, a compression module, an encryption module, a rendering module, and a synthesis module may also be implemented by using a field-programmable gate array (FPGA); for a specific implementation manner, refer to some approaches, and details are not described herein. The present disclosure includes but is not limited to the foregoing implementation manners. It should be understood that all solutions fall within the protection scope of the embodiments of present disclosure, provided that they are implemented according to an idea of the present disclosure.

Figure 19:
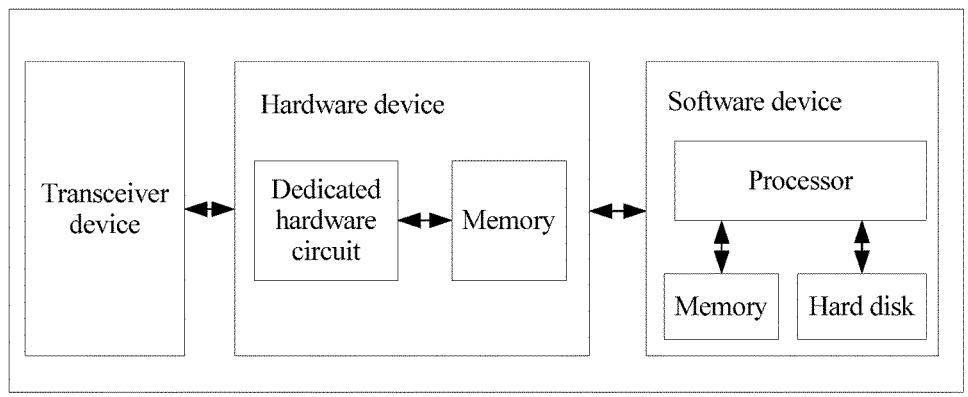
FIG. 19 is a schematic diagram of another embodiment of a user equipment according to an embodiment of the present disclosure.

An embodiment provides a hardware structure of a user equipment. Referring to FIG. 19, the hardware structure of the user equipment may include three parts a transceiver device, a software device, and a hardware device.

The transceiver device is a hardware circuit configured to complete packet transceiving.

The hardware device may also be referred to as a "hardware processing module", or may be simply referred to as "hardware". The hardware device mainly includes a hardware circuit that implements some specific functions based on a dedicated hardware circuit such as an FPGA or an application-specific integrated circuit (ASIC) (which may cooperate with another auxiliary device, such as a memory). A processing speed of the hardware device is generally higher than that of a general purpose processor. However, it is difficult to change a function of the dedicated hardware circuit after the function is customized. Therefore, the dedicated hardware circuit cannot be flexibly implemented, and is generally configured to implement some fixed functions. It should be noted that in practical application, the hardware device may also include a processor such as an MCU (micro control unit, such as a single-chip microcomputer) or a CPU. However, a main function of these processors is to perform control instead of completing big data processing. In such an application scenario, a system formed by these devices is the hardware device.

The software device (or simply referred to as "software") mainly includes a general purpose processor (for example, a CPU) and some auxiliary devices (for example, storage devices such as a memory and a hard disk). A processor may be provided with a corresponding processing function by means of programming. When the processor is implemented by software, the processor may be flexibly configured according to a service requirement, but a processing speed is generally lower than that of the hardware device. After the software completes processing, processed data may be sent by the transceiver device by using the hardware device, or processed data may be sent to the transceiver device by using an interface connected to the transceiver device.

In this embodiment, the transceiver device is configured to send a part or all of to-be-rendered media content and receive a rendering result; the software device or the hardware device is configured to create a user management instance, and the like.

Other functions of the hardware device and the software device have been described in detail in the foregoing embodiments, and details are not described herein again.

With reference to the accompanying drawings, the following provides a detailed description of a technical solution in which a sending module and a receiving module may be implemented by an I/O device (for example, a network adapter), and a determining module, a compression module, an encryption module, a rendering module, and a synthesis module may be implemented by executing a program or an instruction in a memory by a processor.

Figure 20:
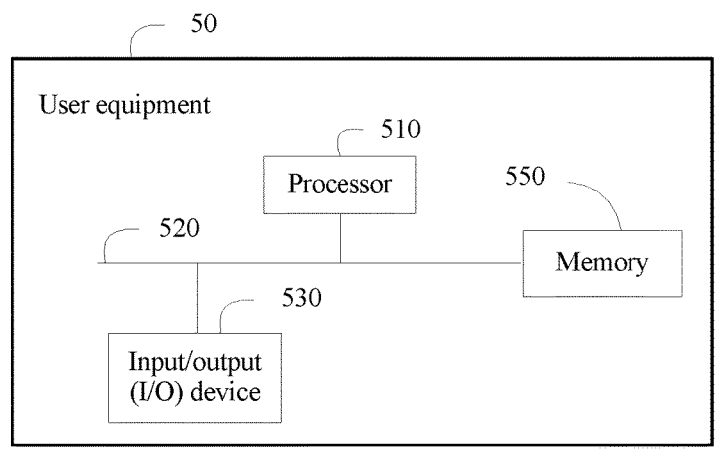
FIG. 20 is a schematic diagram of another embodiment of a user equipment according to an embodiment of the present disclosure.

FIG. 20 is a schematic structural diagram of a user equipment 50 according to an embodiment of the present disclosure. The user equipment 50 is applied in a rendering system. The rendering system further includes a cloud device. The user equipment 50 includes a processor 510, a memory 550, and an I/O device 530. The memory 550 may include a read-only memory and a random access memory, and provides the processor 510 with an operation instruction and data. A part of the memory 550 may further include a nonvolatile random access memory (NVRAM).

In some implementation manners, the memory 550 stores the following elements an executable module or an executable data structure, or a subset of an executable module and an executable data structure, or an extended subset of an executable module and an executable data structure.

In this embodiment of a rendering solution in which the user equipment and the cloud device respectively render a part of to-be-rendered media content in the present disclosure, by invoking the operation instruction stored in the memory 550 (the operation instruction may be stored in an operating system), the processor 510 determines, according to a rendering requirement of to-be-rendered media content, that a part of the to-be-rendered media content is to be rendered by the cloud device.

The I/O device 530 sends, to the cloud device, a rendering indication message and first media content that needs to be rendered by the cloud device, where the rendering indication message is used to instruct the cloud device to render the first media content, and the first media content is a part of the to-be-rendered media content; and receives a cloud processing result returned by the cloud device for the first media content.

It can be learned that, unlike media content rendering efficiency in some approaches, the user equipment can perform collaborative rendering with the cloud device for the to-be-rendered media content, so as to improve media content rendering efficiency.

The processor 510 controls an operation of the user equipment 50, and the processor 510 may also be referred to as a CPU The memory 550 may include a read-only memory and a random access memory, and provides the processor 510 with an instruction and data. A part of the memory 550 may further include a NVRAM. In specific application, all components of the user equipment 50 are coupled together by using a bus system 520, where the bus system 520 may further include a power supply bus, a control bus, a status signal bus, and the like in addition to a data bus. However, for clarity of description, various buses are marked as the bus system 520 in the figure.

The methods disclosed in the foregoing embodiments of the present disclosure may be applied in the processor 510, or implemented by the processor 510. The processor 510 may be an integrated circuit chip, and has a signal processing capability. In an implementation process, all steps in the foregoing methods may be completed by using an integrated logic circuit of hardware in the processor 510 or a software instruction. The foregoing processor 510 may be a general purpose processor, a DSP, an ASIC, a FPGA) or another programmable logic device, a discrete gate or a transistor logic device, or a discrete hardware component, which may implement or perform all methods, steps, and the logical block diagrams disclosed in the embodiments of the present disclosure. The general purpose processor may be a microprocessor, or the processor may also be any conventional processor, or the like. The steps of the methods disclosed in the embodiments of the present disclosure may be directly performed by a hardware decoding processor, or may be performed by a combination of a hardware module and a software module in a decoding processor. The software module may be located in a mature storage medium in the storage field, such as a random access memory, a flash memory, a read-only memory, a programmable read-only memory, an electrically erasable programmable memory, or a register. The storage medium is located in the memory 550. The processor 510 reads information in the memory 550, and implements the steps of the foregoing methods in combination with hardware of the processor 510.

Optionally, the rendering indication message carries a rendering requirement parameter for the first media content, and the rendering requirement parameter is used to instruct the cloud device to render the first media content according to the rendering requirement parameter.

Optionally, the processor 510 is further configured to render second media content to obtain a rendering result of the second media content, where the second media content is remaining media content in the to-be-rendered media content except the first media content; and synthesize the cloud processing result and the rendering result of the second media content to obtain a synthesis result of the to-be-rendered media content, where the cloud processing result is a rendering result of the first media content.

Optionally, the processor 510 is further configured to render second media content to obtain a rendering result of the second media content, where the second media content is remaining media content in the to-be-rendered media content except the first media content; and synthesize the cloud processing result and the rendering result of the second media content to obtain a synthesis result of the to-be-rendered media content, where the cloud processing result is obtained by synthesizing multiple layers in a rendering result of the first media content by the cloud device.

Optionally, the processor 510 is further configured to compress the first media content to obtain compressed media content; and the I/O device 530 is configured to send the rendering indication message and the compressed media content to the cloud device.

Optionally, the processor 510 is further configured to encrypt the first media content to obtain encrypted media content; and the I/O device 530 is configured to send the rendering indication message and the encrypted media content to the cloud device.

Optionally, the processor 510 is further configured to perform double processing, that is, encryption and compression, on the first media content to obtain double-processed media content; and the I/O device 530 is configured to send the rendering indication message and the double-processed media content to the cloud device.

Optionally, the processor 510 is further configured to render, according to a quantity of cores of the user equipment, the second media content by using multiple threads corresponding to the quantity of cores, so as to obtain the rendering result of the second media content.

In this embodiment of a rendering solution in which the cloud device renders all to-be-rendered media content in the present disclosure, by invoking the operation instruction stored by the memory 550 (the operation instruction may be stored in an operating system), the processor 510 determines, according to the rendering requirement of the to-berendered media content, that all to-be-rendered media content is to be rendered by the cloud device.

The I/O device 530 sends a rendering indication message and the to-be-rendered media content to the cloud device, where the rendering indication message carries a rendering requirement parameter for the to-be-rendered media content, and the rendering indication message is used to instruct the cloud device to render the to-be-rendered media content according to the rendering requirement parameter; and receives a cloud processing result returned by the cloud device for the to-be-rendered media content.

Unlike media content rendering efficiency in some approaches, after the user equipment learns the to-be-rendered media content, customization can be performed according to hardware performance of the user equipment, and the to-be-rendered media content is sent to the cloud device. The cloud device obtains, by means of rendering according to the rendering requirement parameter, a rendering result that meets a requirement of the user equipment. In this way, the user equipment collaborates or cooperates with the cloud device, and the cloud device completes rendering, which not only improves media content rendering efficiency, but also implements personalized rendering customization.

Optionally, the processor 510 is further configured to synthesize multiple layers in the rendering result of the to-be-rendered media content to obtain a synthesis result of the to-be-rendered media content.

Optionally, the processor 510 is further configured to compress the to-be-rendered media content to obtain compressed media content; and the I/O device 530 is configured to send the rendering indication message and the compressed media content to the cloud device.

Optionally, the processor 510 is further configured to encrypt the to-be-rendered media content to obtain encrypted media content; and the I/O device 530 is configured to send the rendering indication message and the encrypted media content to the cloud device.

Optionally, the processor 510 is further configured to perform double processing, that is, encryption and compression, on the to-be-rendered media content to obtain double-processed media content; and the I/O device 530 is configured to send the rendering indication message and the double-processed media content to the cloud device.

To understand all embodiments corresponding to FIG. 20, refer to related descriptions in FIG. 1 to FIG. 18, and details are not described herein again.

Figure 21:
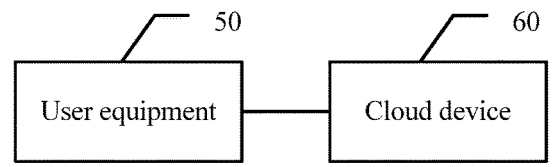
FIG. 21 is a schematic diagram of an embodiment of a media content rendering system according to an embodiment of the present disclosure.

Referring to FIG. 21, an embodiment of a media rendering system according to an embodiment of the present disclosure includes user equipment 50 and a cloud device 60; where the user equipment 50 is configured to determine, according to a rendering requirement of to-be-rendered media content, that a part of the to-be-rendered media content is to be rendered by the cloud device, and send, to the cloud device, a rendering indication message and first media content that needs to be rendered by the cloud device, where the rendering indication message is used to instruct the cloud device to render the first media content, and the first media content is a part of the to-be-rendered media content; the cloud device 60 is configured to render the first media content according to the rendering indication message, and return a cloud processing result to the user equipment for the first media content; and the user equipment 50 is configured to receive the cloud processing result returned by the cloud device for the first media content.

Unlike media content rendering efficiency in some approaches, according to the media content rendering system provided in this embodiment of the present disclosure, the user equipment can perform collaborative rendering with the cloud device for the to-be-rendered media content, so that media content rendering efficiency is improved.

In addition, the user equipment 50 is configured to determine, according to a rendering requirement of to-be-rendered media content, that all to-be-rendered media content is to be rendered by a cloud device, and send a rendering indication message and the to-be-rendered media content to the cloud device, where the rendering indication message carries a rendering requirement parameter for the to-be-rendered media content, and the rendering indication message is used to instruct the cloud device to render the to-be-rendered media content according to the rendering requirement parameter; the cloud device 60 is configured to render the to-be-rendered media content according to the rendering indication message, and return a cloud processing result to the user equipment for the to-be-rendered media content; and the user equipment 50 is configured to receive the cloud processing result returned by the cloud device for the to-be-rendered media content.

Unlike rendering efficiency of user equipment in some approaches, according to the media content rendering system provided in this embodiment of the present disclosure, after the user equipment learns the to-be-rendered media content, customization can be performed according to hardware performance of the user equipment, and the to-be-rendered media content is sent to the cloud device, so that the cloud device performs rendering according to the rendering requirement parameter. In this way, the user equipment collaborates or cooperates with the cloud device, and the cloud device completes rendering, which not only improves media content rendering efficiency, but also implements personalized rendering customization.

A person of ordinary skill in the art may understand that all or a part of the steps of the methods in the embodiments may be implemented by a program instructing relevant hardware. The program may be stored in a computer readable storage medium. The storage medium may include a ROM, a RAM, a magnetic disk, or an optical disc.

A media content rendering method, a user equipment, and a system provided in the embodiments of the present disclosure are described in detail above. A principle and implementation manners of the present disclosure are described herein by using specific examples. The descriptions about the embodiments of the present disclosure are merely provided to help understand the method and core ideas of the present disclosure. In addition, a person of ordinary skill in the art can make variations and modifications to the present disclosure in terms of specific implementation manners and application scope according to the ideas of the present disclosure. Therefore, the content of this specification shall not be construed as a limitation on the present disclosure.

What is claimed is:

1. A media content rendering method in a user equipment in a rendering system comprising a cloud device, the method comprising:
    determining, by the user equipment, that a first media content of to-be-rendered media content is to be rendered by the cloud device;
    sending, by the user equipment to the cloud device, a rendering indication message and the first media content to be rendered by the cloud device, wherein the rendering indication message instructs the cloud device to render the first media content based on a rendering requirement;
    receiving, by the user equipment, a cloud processing result from the cloud device for the first media content;

rendering, by the user equipment, second media content to obtain a rendering result of the second media content, wherein the second media content comprises remaining media content in the to-be-rendered media content except the first media content; and synthesizing, by the user equipment, the cloud processing result and the rendering result of the second media content to obtain a synthesis result of the to-be-rendered media content, wherein the cloud processing result is a rendering result of the first media content.

2. The method of claim 1, wherein the rendering indication message comprises a rendering requirement parameter for the first media content, wherein the rendering requirement parameter instructs the cloud device to render the first media content based on the rendering requirement parameter.

3. The method of claim 1,
wherein the cloud processing result is obtained by synthesizing multiple layers in a rendering result of the first media content by the cloud device.

4. The method of claim 1, wherein before sending the rendering indication message and first media content, the method further comprises compressing the first media content to obtain compressed media content, wherein the sending the rendering indication message and first media content comprises sending the rendering indication message and the compressed media content to the cloud device.

5. The method of claim 1, wherein before sending the rendering indication message and first media content, the method further comprises encrypting the first media content to obtain encrypted media content, wherein the sending the rendering indication message and first media content comprises sending the rendering indication message and the encrypted media content to the cloud device.

6. The method of claim 1, wherein before sending the rendering indication message and first media content, the method further comprises performing encryption and compression on the first media content to obtain double-processed media content, wherein sending the rendering indication message and first media content comprises sending the rendering indication message and the double-processed media content to the cloud device.

7. The method of claim 1, wherein rendering the second media content comprises rendering, according to a quantity of cores of the user equipment, the second media content by using multiple threads corresponding to the quantity of cores, so as to obtain the rendering result of the second media content.

8. The method of claim 1, wherein determining that the first media content is to be rendered by the cloud device comprises:
determining a computation workload of rendering the to-be-rendered media content;
determining the computational workload exceeds a preset threshold; and
determining the first media content when the computational workload exceeds the threshold.

9. The method of claim 1, wherein determining that the first media content is to be rendered by the cloud device comprises:
determining whether a rendering region and a resolution of the to-be-rendered media content are greater than a preset threshold; and
determining the first media content when the rendering region and the resolution exceed the preset threshold.

10. The method of claim 1, wherein determining that the first media content is to be rendered by the cloud device comprises:
determining whether a remaining power of the user device is below a preset threshold; and
determining the first media content when the remaining power is below the preset threshold.

11. A user equipment, comprising:
an input/output device;
a memory; and
a processor coupled to the input/output device and the memory, wherein the processor is configured to determine that a first media content of to-be-rendered media content is to be rendered by a cloud device,
wherein the input/output device is configured to:
send, to the cloud device, a rendering indication message and the first media content, wherein the rendering indication message instructs the cloud device to render the first media content based on a rendering requirement; and
receive a cloud processing result from the cloud device for the first media content;
wherein the processor is further configured to:
render second media content to obtain a rendering result of the second media content, wherein the second media content comprises remaining media content in the to-be-rendered media content except the first media content; and
synthesize the cloud processing result and the rendering result of the second media content to obtain a synthesis result of the to-be-rendered media content, wherein the cloud processing result is a rendering result of the first media content.

12. The user equipment of claim 11, wherein the rendering indication message comprises a rendering requirement parameter for the first media content, wherein the rendering requirement parameter instructs the cloud device to render the first media content based on the rendering requirement parameter.

13. The user equipment of claim 11,
wherein the cloud processing result is obtained by synthesizing multiple layers in a rendering result of the first media content by the cloud device.

14. The user equipment of claim 11, wherein the processor is further configured to, prior to the input/output device configured to send the first media content, compress the first media content.

15. The user equipment of claim 11, wherein the processor is further configured to, prior to the input/output device configured to send the first media content, encrypt the first media content.

16. The user equipment of claim 11, wherein the processor is further configured to, prior to the input/output device configured to send the first media content, perform encryption and compression on the first media content.

17. A non-transitory computer-readable storage medium comprising instructions which, when executed by a user equipment, cause the user equipment to:
determine that a first media content of to-be-rendered media content is to be rendered by the cloud device;
send, to the cloud device, a rendering indication message and the first media content, wherein the rendering indication message instructs the cloud device to render the first media content based on a rendering requirement;
receive a cloud processing result from the cloud device for the first media content;

render second media content to obtain a rendering result of the second media content, wherein the second media content comprises remaining media content in the to-be-rendered media content except the first media content; and synthesize the cloud processing result and the rendering result of the second media content to obtain a synthesis result of the to-be-rendered media content.

18. The non-transitory computer-readable storage medium of claim 17, wherein the rendering indication message comprises a rendering requirement parameter for the first media content, and wherein the rendering requirement parameter instructs the cloud device to render the first media content based on the rendering requirement parameter.

19. The non-transitory computer-readable storage medium of claim 17,
wherein the cloud processing result is obtained by synthesizing multiple layers in a rendering result of the first media content by the cloud device.

20. The non-transitory computer-readable storage medium of claim 17, wherein the instructions further cause the user equipment to compress the first media content prior to the instructions that cause the user equipment to send the first media content.

* * * * *